United States Patent
Miyamoto et al.

(10) Patent No.: US 10,798,247 B2
(45) Date of Patent: Oct. 6, 2020

(54) ACOUSTIC ECHO SUPPRESSION DEVICE AND ACOUSTIC ECHO SUPPRESSION METHOD

(71) Applicant: PANASONIC INTELLECTUAL PROPERTY MANAGEMENT CO., LTD., Osaka (JP)

(72) Inventors: Masanari Miyamoto, Fukuoka (JP); Hiromasa Ohashi, Osaka (JP); Naoya Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/489,897

(22) PCT Filed: Jan. 29, 2018

(86) PCT No.: PCT/JP2018/002737
§ 371 (c)(1),
(2) Date: Aug. 29, 2019

(87) PCT Pub. No.: WO2018/168227
PCT Pub. Date: Sep. 20, 2018

(65) Prior Publication Data
US 2020/0007690 A1    Jan. 2, 2020

(30) Foreign Application Priority Data

Mar. 16, 2017   (JP) .................................. 2017-051911

(51) Int. Cl.
*H04M 9/08* (2006.01)
*H04B 3/20* (2006.01)
*B60R 11/02* (2006.01)

(52) U.S. Cl.
CPC .............. *H04M 9/082* (2013.01); *H04B 3/20* (2013.01); *B60R 11/02* (2013.01); *H04R 2410/01* (2013.01)

(58) Field of Classification Search
CPC .......... B60R 11/02; H04B 3/20; H04M 9/082; H04R 2410/01
(Continued)

(56) References Cited

U.S. PATENT DOCUMENTS 5,999,828 A * 12/1999 Sih ........................ H04M 9/082
                                                    379/406.06
7,171,003 B1 * 1/2007 Venkatesh ................ H03G 3/32
                                                    381/66
(Continued)

FOREIGN PATENT DOCUMENTS

| JP | 2007-019595 | 1/2007 |
| JP | 2009-216835 | 9/2009 |
| JP | 2015-029241 | 2/2015 |

OTHER PUBLICATIONS

International Search Report issued in International Pat. Appl. No. PCT/JP2018/002737, dated Apr. 10, 2018.

*Primary Examiner* — Hemant S Patel
(74) *Attorney, Agent, or Firm* — Greenblum & Bernstein, P.L.C.

(57) ABSTRACT

A microphone picks-up voice of a driver. A first echo suppression unit outputs a voice signal after first echo suppression based on a voice signal of the driver and a voice signal after echo suppression in the past (first reference signal) stored in a buffer memory. A second echo suppression unit outputs a voice signal after second echo suppression based on a voice signal of the driver and a voice signal after the echo suppression in the past (second reference signal) stored in a buffer memory. An output signal selector selects one of the voice signals after the first echo suppres-
(Continued)

sion or the voice signal after the second echo suppression according to a detection result of the presence or absence of a system variation by a system variation detector, and causes a speaker to output the selected voice signal.

20 Claims, 20 Drawing Sheets

(58) Field of Classification Search
USPC .................................................. 379/406.01
See application file for complete search history.

(56) References Cited

U.S. PATENT DOCUMENTS

| | | |
|---|---|---|
| 2007/0019825 A1 | 1/2007 | Marumoto et al. |
| 2014/0376740 A1 | 12/2014 | Shigenaga et al. |
| 2016/0205263 A1* | 7/2016 | Liu .................. H04M 9/082 455/570 |

* cited by examiner

ACOUSTIC ECHO SUPPRESSION DEVICE AND ACOUSTIC ECHO SUPPRESSION METHOD

TECHNICAL FIELD

The present disclosure relates to an acoustic echo suppression device and an acoustic echo suppression method for suppressing acoustic echo remaining in a vehicle compartment.

BACKGROUND ART

For example, in a relatively large vehicle having a plurality of (for example, three or more rows of) seats disposed in a front and rear direction, such as a minivan, a wagon, a one-box car, or the like, it is contemplated to equip a configuration to transmit voice by using microphones and speakers installed in each of the seats as a conversation assistance system so that a driver sitting in the driver's seat and a passenger (for example, the driver's friend) sitting in a rear seat can have a smooth conversation.

In the conversation assistance system, the voice uttered by the driver is picked-up by the microphone installed in the driver's seat and is output from the speaker installed in the rear seat, so that it is easy for a rear-seat passenger to hear the driver's voice even while traveling on a non-paved road where a vehicle is likely to vibrate or in a noisy city.

In addition, the voice uttered by the rear-seat passenger is picked-up by the microphone installed in the rear seat and is output from the speaker installed in the driver's seat, so that the driver can easily hear the voice of the rear-seat passenger.

In such a conversation assistance system, since the reproduced sound output from the speaker is picked-up by the microphone as an echo sound, acoustic quality (in other words, sound quality) of the speaker sound deteriorates, which make it difficult to hear, resulting in difficulty in smooth conversation.

Therefore, it is desirable to improve the sound quality of the sound output from the speaker.

Here, as a related art regarding supporting a conversation between the driver of the vehicle and the other passengers, an acoustic echo canceller is known, which assumes in advance the seating arrangement pattern of passengers as a condition in the vehicle compartment, and measures transmission characteristics of the sound according to each seat arrangement pattern, to estimate and cancel acoustic echoes included in a voice signal output from a speaker by using the transmission characteristics that are obtained from the result of the measuring and stored in the memory or the like (for example, see PTL 1).

However, the transmission characteristics of the sound vary largely depending on factors other than the seating arrangement pattern of the passengers in the vehicle (for example, height, body shape of a passenger, reclining of a seat by a passenger, opening or closing of a vehicle window or door by a passenger).

Therefore, it is practically quite difficult to prepare the transmission characteristics of the sound in all situations in the vehicle, taking into consideration of not only the sitting arrangement pattern of the passengers but also variations in the environment (system) in the vehicle.

In addition, during traveling, when the transmission characteristics of the sound of the sound field in the vehicle change largely, such as, when the passenger opens or closes the window, reclines the seat, or moves his or her face largely, and the like (in other words, when there is a sudden variation in the environment (system)), the reliability of the sound transmission characteristics prepared in advance is lowered, which is insufficient in terms of the level of accuracy required for cancelling or suppressing the acoustic echoes.

Therefore, when using the transmission characteristics deviating from the transmission characteristics of the sound in an actual sound field, the acoustic echo cannot be sufficiently cancelled or suppressed, and the sound quality of the voice output from the speaker is deteriorated.

The present disclosure has been devised in view of the related situations described above, and aims to provide an acoustic echo suppression device and an acoustic echo suppression method for suppressing the deterioration of the sound quality of an output voice even when there is a sudden system variation, by following the system variation.

CITATION LIST

Patent Literature

PTL 1: Japanese Patent Unexamined Publication No. 2009-216835

PTL 2: Japanese Patent Unexamined Publication No. 2007-19595

SUMMARY OF THE INVENTION

According to an aspect of the present disclosure, there is provided an acoustic echo suppression device that suppresses acoustic echo in an environment in which a sound pick-up unit for picking-up sound is installed, includes a first filter processor which outputs a first suppression voice signal obtained by suppressing an echo component included in a voice signal based on the voice signal of a person in the environment picked-up by the sound pick-up unit and a first reference signal, a second filter processor which outputs a second suppression voice signal obtained by suppressing the echo component included in the voice signal based on the voice signal of the person in the environment picked-up by the sound pick-up unit and a second reference signal, a detector that detects presence or absence of a variation in the environment, and an output selector that selects one of the first suppression voice signal and the second suppression voice signal according to a detection result of the presence or absence of the variation in the environment and causes a voice output unit to output the selected voice signal.

According to another aspect of the present disclosure, there is provided an acoustic echo suppression method of suppressing acoustic echo in an environment in which a sound pick-up unit for picking-up sound is installed, the method includes outputting a first suppression voice signal obtained by suppressing an echo component included in a voice signal based on the voice signal of a person in the environment picked-up by the sound pick-up unit and a first reference signal, outputting a second suppression voice signal obtained by suppressing the echo component included in the voice signal based on the voice signal of the person in the environment picked-up by the sound pick-up unit and a second reference signal, detecting presence or absence of a variation in the environment, and selecting one of the first suppression voice signal and the second suppression voice signal according to a detection result of the presence or absence of the variation of the environment and causing a voice output unit to output the selected voice signal.

According to the present disclosure, even when there is a sudden system variation, it is possible to follow the system variation to suppress the sound quality deterioration of the output voice.

DESCRIPTION OF EMBODIMENTS

Hereinafter, each embodiment which specifically disclosed the acoustic echo suppression device and the acoustic echo suppression method according to the present disclosure will be described in detail with reference to the drawings as appropriate.

However, detailed explanation more than necessary may not be described.

For example, the detailed description of already well-known matters and redundant description of substantially the same configuration may not be repeated.

This is to avoid unnecessary redundancy in the following description and to facilitate understanding by those skilled in the art.

It should be noted that the attached drawings and the following description are provided to enable those skilled in the art to fully understand the present disclosure, and are not intended to limit the claimed subject matter.

The acoustic echo suppression device of each embodiment is applied to an in-vehicle conversation assistance system that assists conversation between passengers performed in a vehicle compartment of a vehicle, for example.

However, it goes without saying that the acoustic echo suppression device of the following each embodiment is naturally not limited to be applied to the vehicle conversation assistance system described above.

Exemplary Embodiment 1

Figure 1:
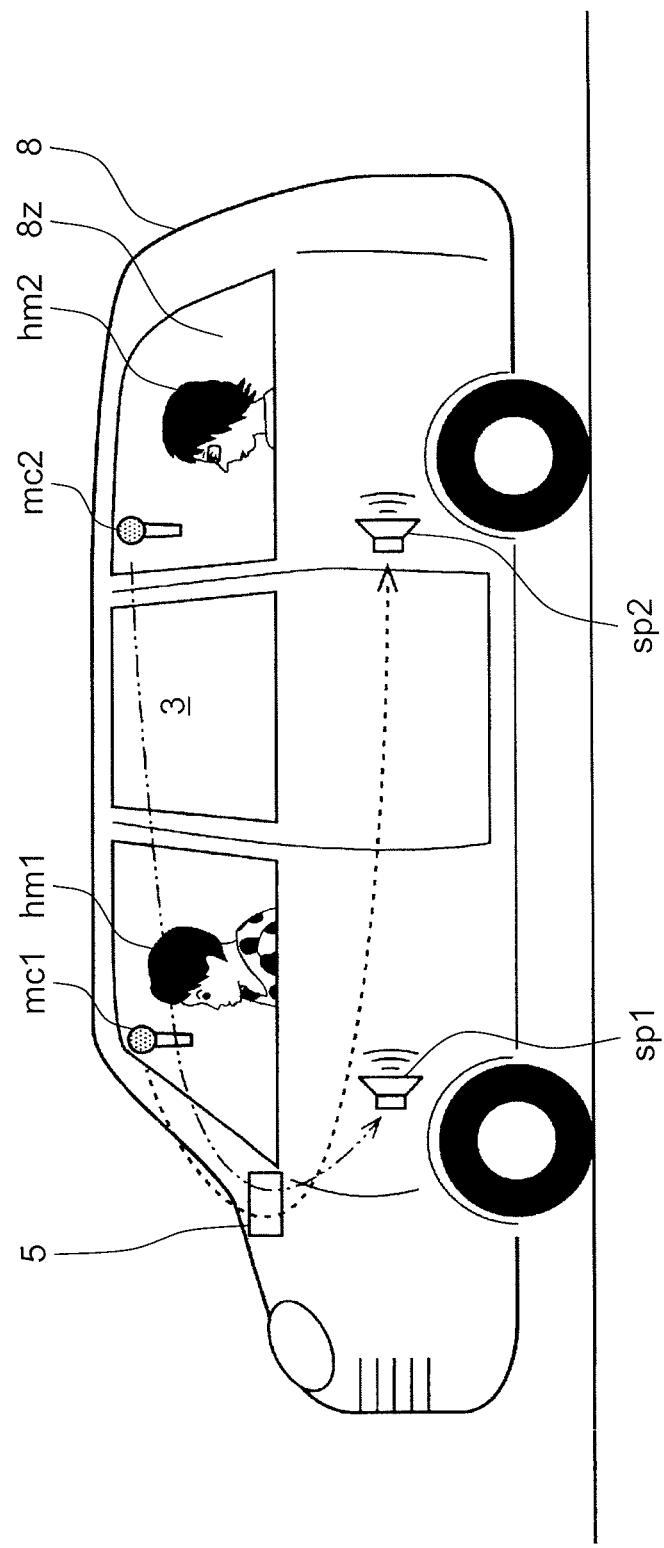
FIG. 1 is a diagram showing an example of an outline of an in-vehicle conversation assistance system in which an acoustic echo suppression device according to Exemplary Embodiment 1 is mounted.

FIG. 1 is a diagram showing an example of an outline of in-vehicle conversation assistance system 3 in which acoustic echo suppression device 5 according to Exemplary Embodiment 1 is mounted.

In-vehicle conversation assistance system 3 is mounted on vehicle 8 as an example of the environment, and has a configuration including acoustic echo suppression device 5 installed in the vicinity of the instrument panel in vehicle compartment 8z, microphone mc1 and speaker sp1 disposed in the vicinity of the driver's seat, and microphone mc2 and speaker sp2 disposed in the vicinity of the rear seat.

In the following description, in-vehicle conversation assistance system 3 assists the conversation between driver hm1 and passenger hm2 seated in the rear seat, but in a case of a vehicle having three rows of seats in the front and rear direction, a combination of a passenger who talks is optional, such as a conversation between a passenger seated in the front passenger seat and a passenger seated in the central seat.

Figure 2:
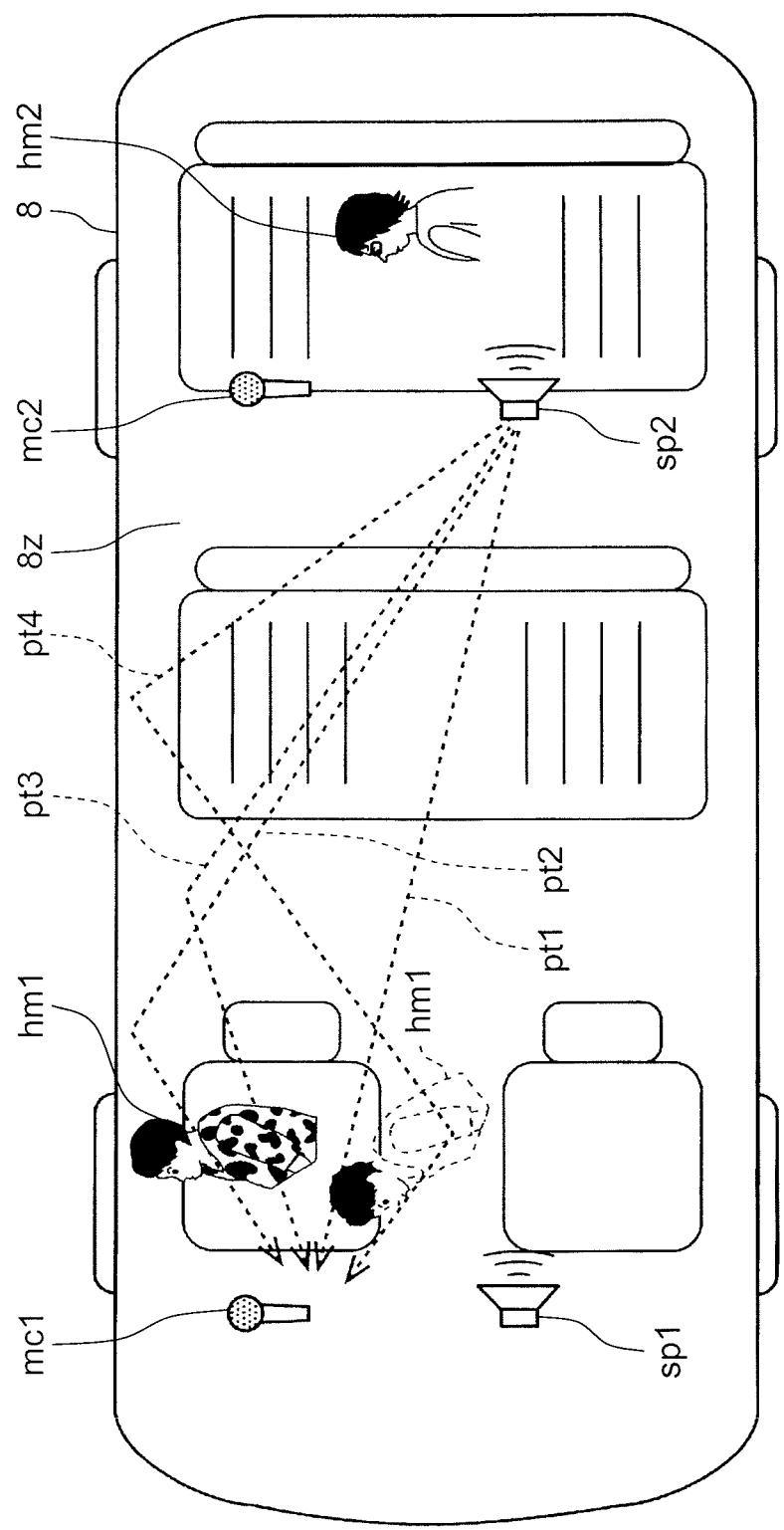
FIG. 2 is a diagram for explaining an example of a transmission path of acoustic echo in a vehicle compartment.

FIG. 2 is a view for explaining an example of the transmission path of the acoustic echo in vehicle compartment 8z.

The voice uttered by driver hm1 is picked-up by microphone mc1.

At the same time as the sound is picked-up by microphone mc1, the reproduced sound output from speaker sp2 disposed in the rear seat is directly picked-up or reflected and picked-up by microphone mc1 through transmission paths pt1, pt2, pt3, and pt4 in vehicle compartment 8z as the acoustic echo.

For example, FIG. 2 shows transmission path pt1 of the direct wave, in which the sound output from speaker sp2 reaches microphone mc1 directly, transmission path pt2 of the reflected wave in which the sound output from speaker sp2 is reflected by the door on the driver's seat side and reaches microphone mc1 transmission path pt3 of the reflected wave in which the sound output from speaker sp2 is reflected by the ceiling in vehicle compartment 8z and reaches microphone mc1, and transmission path pt4 of the reflected wave in which the sound output from speaker sp2 is reflected by the door on the rear seat side, and further is reflected by the side box of the driver's seat and reaches microphone mc1.

As shown by the dotted line in FIG. 2, when driver hm1 moves the body largely, transmission path pt4 is not present or largely varies, and as a result, the characteristics of the sound field in vehicle compartment 8z is changed.

As a result, acoustic echo is included in the reproduced sound output from speaker sp2, and the sound quality of the reproduced sound heard by passenger hm2 seated in the rear seat deteriorates.

Likewise, the voice uttered by passenger hm2 seated in the rear seat is picked-up by microphone mc2, and at the same time, the reproduced sound output from speaker sp1 disposed in the driver's seat is directly picked-up or reflected and picked-up by microphone mc2 through each transmission path (not shown) in vehicle compartment 8z as the acoustic echo.

As a result, the acoustic echo is included in the reproduced sound output from speaker sp1, and the sound quality of the reproduced sound heard by driver hm1 deteriorates.

On the other hand, acoustic echo suppression device 5 according to the present embodiment suppresses the acoustic echo included in the reproduced sound output from speakers sp1 and sp2 to improve the sound quality.

Acoustic echo suppression device 5 has acoustic echo reduction functions in the number corresponding to the number of combinations of microphones and speakers.

The plurality of acoustic echo reduction functions have the same configuration and perform the same operation, so, in the following, the case in which the voice picked-up by microphone mc1 on the driver's seat side is output from speaker sp2 on the rear seat side will be described as an example.

It should be noted that the same applies to the case where the voice picked-up by microphone mc2 on the rear seat side is output from speaker sp1 on the driver's seat side.

Figure 3:
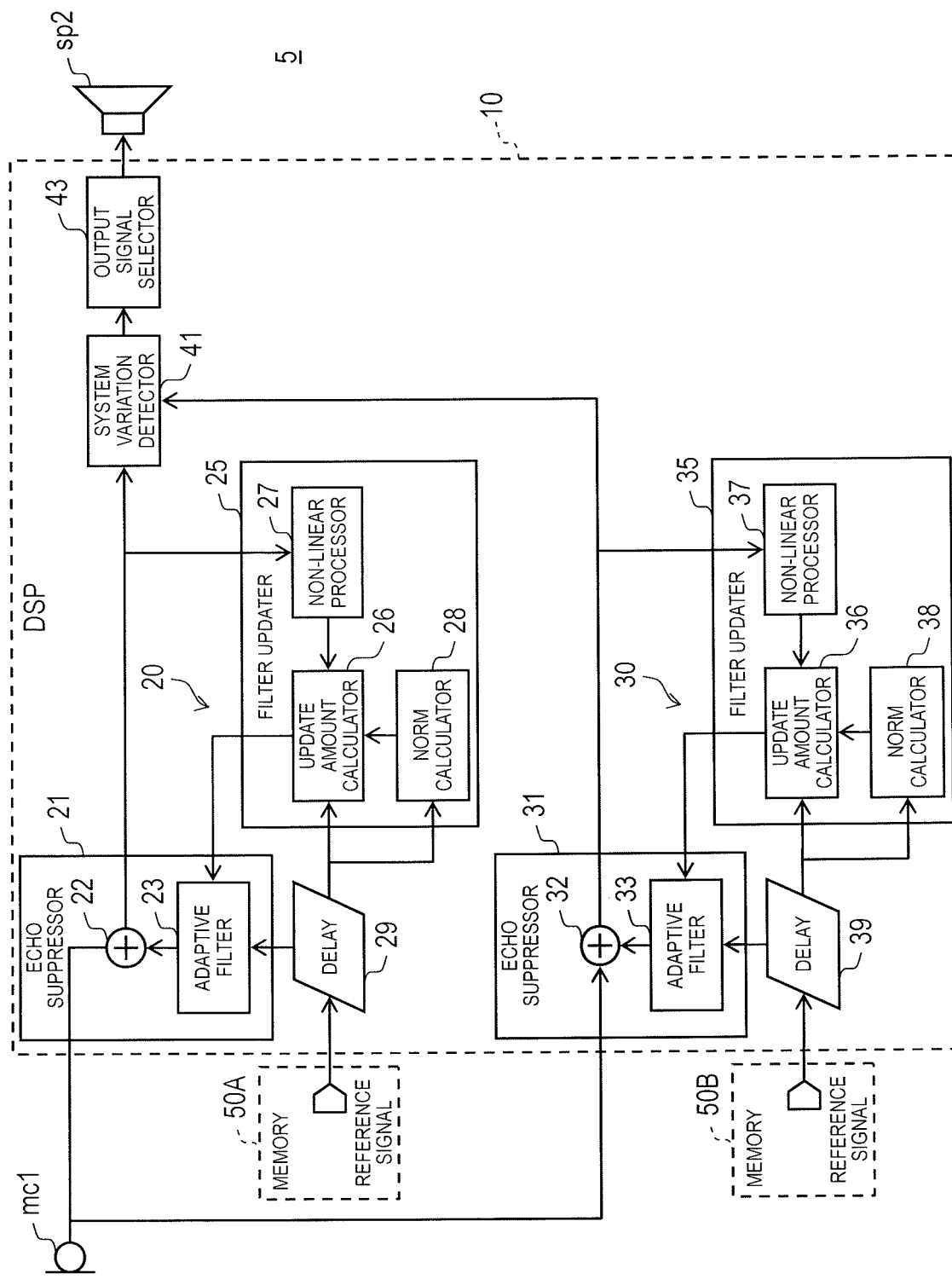
FIG. 3 is a block diagram showing in detail an example of a functional configuration of the acoustic echo suppression device.

FIG. 3 is a block diagram showing in detail an example of a functional configuration of acoustic echo suppression device 5.

Acoustic echo suppression device 5 to which microphone mc1 and speaker sp2 are connected is a howling canceler that reduces the acoustic echo included in the voice output from speaker sp2 and mainly includes digital signal processor (DSP) 10 and buffer memories 50A and 50B.

Microphone mc1 and speaker sp2 may be included in acoustic echo suppression device 5.

Likewise, microphone mc2 and speaker sp1 may be included in acoustic echo suppression device 5.

Microphone mc1 as an example of the sound pick-up unit is disposed in the vicinity of the driver's seat and picks-up the voice uttered by driver hm1, and may be any of a directional microphone and a non-directional microphone.

Speaker sp2 as an example of a voice output unit is disposed in the vicinity of the rear seat and outputs the voice picked-up by microphone mc1, and may be any of a directional speaker or a non-directional speaker.

Each of buffer memories 50A and 50B stores the signals (speaker signals) after the acoustic echo suppression in the past (strictly, the timing immediately before the current time) to be output from speaker sp2 as the first reference signal and the second reference signal, respectively DSP 10 is for suppressing the acoustic echo from the voice picked-up by microphone mc1 and outputting the signal after the acoustic echo suppression to speaker sp2, and includes first echo suppression unit 20, second echo suppression unit 30, system variation detector 41, and output signal selector 43.

First echo suppression unit 20 as an example of the first filter processor includes first echo suppressor 21, first filter updater 25, and delay 29.

First echo suppressor 21 includes adder 22 and adaptive filter 23, and performs the processing of acoustic echo suppression by adding the pseudo echo signal generated by adaptive filter 23 to the voice picked-up by microphone mc1 by adder 22 in order to cancel an acoustic echo included in the voice picked-up by microphone mc1.

First echo suppressor 21 outputs the output of adder 22 (in other words, signal after acoustic echo suppression (echo suppression signal)) to system variation detector 41.

Adaptive filter 23 as an example of the filter unit receives the first reference signal delayed by the delay time by delay 29 (that is, delay device), grows into a filter having a characteristic equivalent to the transmission characteristics until the reproduced sound output from speaker sp2 is picked-up, and performs signal processing by using this filter to generate a pseudo echo signal.

The adaptive filter is a known filter of which filter characteristics may be varied by controlling the number of taps and coefficients of a finite impulse response (FIR) filter as described in the PTLs 1 and 2 described above.

As described above, the first reference signal is stored in buffer memory 50A and a signal (speaker signal) after past acoustic echo suppression (strictly speaking, the timing from the current time to the immediately preceding time) to be output from speaker sp2, and a signal before the time required for the voice output from speaker sp2 to reach microphone mc1.

Therefore, the timing at which the first reference signal delayed by delay 29 is input to adaptive filter 23 coincides with the timing at which the reproduced sound output from speaker sp2 is picked-up by microphone mc1 as an echo sound.

For this reason, the delay time of delay 29 is a value obtained by dividing the distance between speaker sp2 and microphone mc1 by the rate of sound, and is about 10 msec when the distance between the driver's seat and the rear seat in the vehicle compartment is about 4 m, for example.

First filter updater 25 controls the coefficients of the FIR filter so that the characteristic of adaptive filter 23 is equivalent to the echo transmission characteristic, and includes update amount calculator 26, non-linear processor 27 and norm calculator 28.

It should be noted that the filter characteristics may be changed by controlling the number of taps of the FIR filter.

Non-linear processor 27 performs non-linear conversion on the signal after the acoustic echo suppression (echo suppression signal), generates a non-linearly converted echo suppression signal and outputs it to update amount calculator 26 to determine whether to change the filter characteristic in the positive direction or in the negative direction.

Norm calculator 28 calculates the norm of the speaker signal.

The norm of the speaker signal is the sum of the magnitudes of the speaker signal within a predetermined time in the past, and is a value indicating the degree of the magnitude of the signal within this time.

Update amount calculator 26 calculates the update amount of the filter characteristic using the norm calculated by norm calculator 28, an echo suppression signal non-linearly converted by non-linear processor 27, and the first reference signal (speaker signal) delayed by the delay time by delay 29.

Like first echo suppression unit 20, second echo suppression unit 30 as an example of the second filter processor includes second echo suppressor 31, second filter updater 35, and delay 39.

However, update rate $\beta$ of the filter coefficient of adaptive filter 33 of second echo suppression unit 30 is set to be faster than update rate $\alpha$ of the filter coefficient of adaptive filter 23 of first echo suppression unit 20.

That is, first echo suppression unit 20 outputs a signal after stable acoustic echo suppression with update rate $\alpha$ slower than update rate $\beta$, when the characteristics of the sound field are not changed significantly.

Meanwhile, second echo suppression unit 30 outputs the signal after fast acoustic echo suppression with update rate $\beta$ faster than update rate $\alpha$ so as to be able to follow the system variation when the characteristic of the sound field changes (for example, when there is a sudden system variation).

Second echo suppressor 31 includes adder 32 and adaptive filter 33, and performs the processing of acoustic echo suppression by adding the pseudo echo signal generated by adaptive filter 33 to the voice picked-up by microphone mc1 by adder 32 in order to cancel an acoustic echo included in the voice picked-up by microphone mc1.

Second echo suppressor 31 outputs the output of adder 32 (in other words, the signal after acoustic echo suppression (echo suppression signal)) to system variation detector 41.

Adaptive filter 33 receives the second reference signal delayed by the delay time by delay 39 (that is, delay device), grows into a filter having a characteristic equivalent to the transmission characteristics until the reproduced sound output from speaker sp2 is picked-up, and performs signal processing by using this filter to generate a pseudo echo signal.

As described above, the second reference signal is stored in buffer memory 50B and a signal (speaker signal) after past acoustic echo suppression (strictly speaking, the timing from the current time to the immediately preceding time) to be output from speaker sp2, and a signal before the time required for the voice output from speaker sp2 to reach microphone mc1.

Therefore, the timing at which the second reference signal is delayed by delay 39 and input to adaptive filter 33 coincides with the timing at which the reproduced sound output from speaker sp2 is picked-up by microphone mc1 as an echo sound.

Therefore, the delay time of delay 39 is a value obtained by dividing the distance between speaker sp2 and microphone mc1 by the rate of sound, and is equal to the delay time of delay 29.

Second filter updater 35 controls the number of taps and the coefficients of the FIR filter so that the characteristic of adaptive filter 33 is equivalent to the echo transmission characteristic, and includes update amount calculator 36, non-linear processor 37 and norm calculator 38.

It should be noted that the filter characteristics may be changed by controlling the number of taps of the FIR filter.

Non-linear processor 37 performs non-linear conversion on the signal after the acoustic echo suppression, generates a non-linearly converted echo suppression signal and outputs it to update amount calculator 36 to determine whether to change the filter characteristic in the positive direction or in the negative direction.

Norm calculator 38 calculates the norm of the speaker signal.

The norm of the speaker signal is the sum of the magnitudes of the speaker signal within a predetermined time in the past, and is a value indicating the degree of the magnitude of the signal within this time.

Update amount calculator 36 calculates the update amount of the filter characteristic using the norm calculated by norm calculator 38, an echo suppression signal non-linearly converted by non-linear processor 37, and the second reference signal (speaker signal) delayed by the delay time by delay 39.

System variation detector 41 receives a signal after acoustic echo suppression output from first echo suppression unit 20 (first suppression voice signal) and a signal after acoustic echo suppression output from second echo suppression unit 30 (second suppression voice signal).

Based on these signals, system variation detector 41 detects whether the transmission characteristics of sound in the sound field are varied, that is, detects the presence or absence of a system variation.

When system variation detector 41 determines that there is no system variation, the magnitude (for example, sound pressure) of the output signal from first echo suppression unit 20 that updates the filter characteristics at the slow update rate $\alpha$ is small as compared with the magnitude (for example, sound pressure) of the output signal from second echo suppression unit 30 that updates the filter characteristics at fast update rate $\beta$.

On the other hand, when system variation detector 41 determines that there is system variation, the magnitude (for example, sound pressure) of the output signal from first echo suppression unit 20 that updates the filter characteristics at the slow update rate $\alpha$ is large as compared with the magnitude (for example, sound pressure) of the output signal from second echo suppression unit 30 that updates the filter characteristics at fast update rate $\beta$.

Thus, when it is determined that the magnitude of the signal output from second echo suppression unit 30 is smaller than the magnitude of the signal output from first echo suppression unit 20, system variation detector 41 determines that there is the system variation.

On the other hand, when it is determined that the magnitude of the output signal from first echo suppression unit 20 is smaller than the magnitude of the output signal from second echo suppression unit 30, system variation detector 41 determines that there is no system variation.

When system variation detector 41 determines that there is no system variation, output signal selector 43 as an example of the output selector outputs the signal after acoustic echo suppression output from first echo suppression unit 20 to speaker sp2.

On the other hand, when system variation detector 41 determines that there is system variation, output signal selector 43 outputs the signal after acoustic echo suppression output from second echo suppression unit 30 to speaker sp2.

An operation of acoustic echo suppression device 5 according to this embodiment described above is illustrated.

Figure 4:
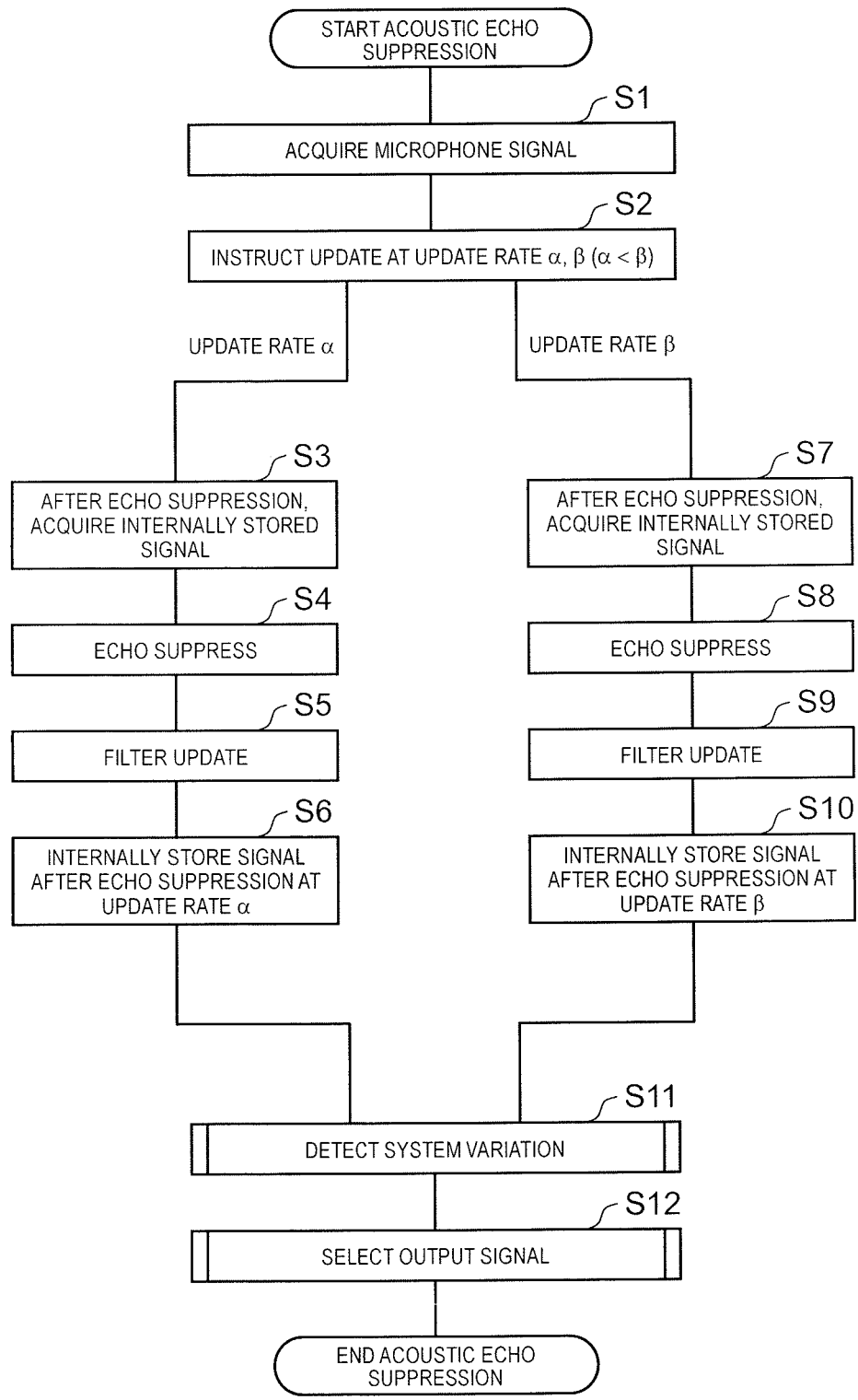
FIG. 4 is a flowchart showing in detail an example of an acoustic echo suppression operation procedure.

FIG. 4 is a flowchart showing in detail an example of the acoustic echo suppression operation procedure.

Each process shown in FIG. 4 is repeatedly executed by DSP 10 when power is supplied to acoustic echo suppression device 5 by turning on an ignition key switch mounted in vehicle 8, for example.

In FIG. 4, DSP 10 acquires the voice picked-up by microphone mc1 (S1).

DSP 10 determines whether or not the current time is the timing corresponding to update rate α and β of the filter coefficients of each of adaptive filters 23 and 33.

When it is the update timing, DSP 10 instructs at least one of first echo suppression unit 20 and second echo suppression unit 30 having the corresponding adaptive filter at the update timing to execute the process of updating the filter coefficient (S2).

In other words, DSP 10 instructs each of first echo suppression unit 20 and second echo suppression unit 30 to execute the process of updating the filter coefficient in parallel in time (S2).

When the current time is the timing of update rate α, DSP 10 executes the process of updating the filter coefficient of adaptive filter 23 of first echo suppression unit 20 in the processes after step S3.

When the current time is the timing of update rate β, DSP 10 executes the process of updating the filter coefficient of adaptive filter 33 of second echo suppression unit 30 in the processes after step S7.

In the present embodiment, due to the relationship of update rate α and update rate β, the frequency of executing the processes of steps S7 to S10 is greater than the frequency of executing the processes of steps S3 to S6.

At the timing of update rate α, first echo suppressor 21 acquires the first reference signal (internal stored signal), which is a signal (speaker signal) after acoustic echo suppression in the past, stored in buffer memory 50A (S3).

First echo suppressor 21 generates a pseudo echo signal by adaptive filter 23 by using the first reference signal delayed by a predetermined time by delay 29 and adds the pseudo echo signal to the voice signal picked-up by microphone mc1, in adder 22.

As a result, first echo suppressor 21 generates a signal after the acoustic echo suppression by subtracting (minus) the difference of the pseudo echo signal from the voice signal picked-up by microphone mc1 (S4).

First filter updater 25 calculates the update amount of the filter characteristic by using the signal after acoustic echo suppression and the delayed first reference signal, and updates the characteristic of adaptive filter 23 (S5).

First echo suppression unit 20 causes buffer memory 50A to store the signal after the acoustic echo suppression generated in step S4 in order to use it as the first reference signal at the time of the next updating process of the filter coefficient (that is, the next update timing based on update rate α) (S6).

Meanwhile, at the timing of update rate β, second echo suppressor 31 acquires the second reference signal (internal stored signal), which is a signal (speaker signal) after acoustic echo suppression in the past, stored in buffer memory 50B (S7).

Second echo suppressor 31 generates a pseudo echo signal by adaptive filter 33 by using the second reference signal delayed by a predetermined time by delay 39 and adds the pseudo echo signal to the voice signal picked-up by microphone mc1, in adder 32.

As a result, second echo suppressor 31 generates a signal after the acoustic echo suppression by subtracting (minus) the difference of the pseudo echo signal from the voice signal picked-up by microphone mc1 (S8).

Second filter updater 35 calculates the update amount of the filter characteristic by using the signal after acoustic echo suppression and the delayed second reference signal, and updates the characteristic of adaptive filter 33 (S9).

Second echo suppression unit 30 causes buffer memory 50B to store the signal after the acoustic echo suppression generated in step S8 in order to use it as the second reference signal at the time of the next updating process of the filter coefficient (that is, the next update timing based on update rate β) (S10).

System variation detector 41 detects whether or not the environment (sound field) in vehicle compartment 8z is changed, that is, the presence or absence of the system variation (S11).

The process of detecting the system variation will be described in detail below.

Output signal selector 43 selects a voice signal to be output to speaker sp2 according to the detection result (that is, the presence or absence of the system variation) by system variation detector 41 (S12).

The output signal selection process will be described in detail below.

After this, DSP 10 ends the process shown in FIG. 4.

Figure 5:
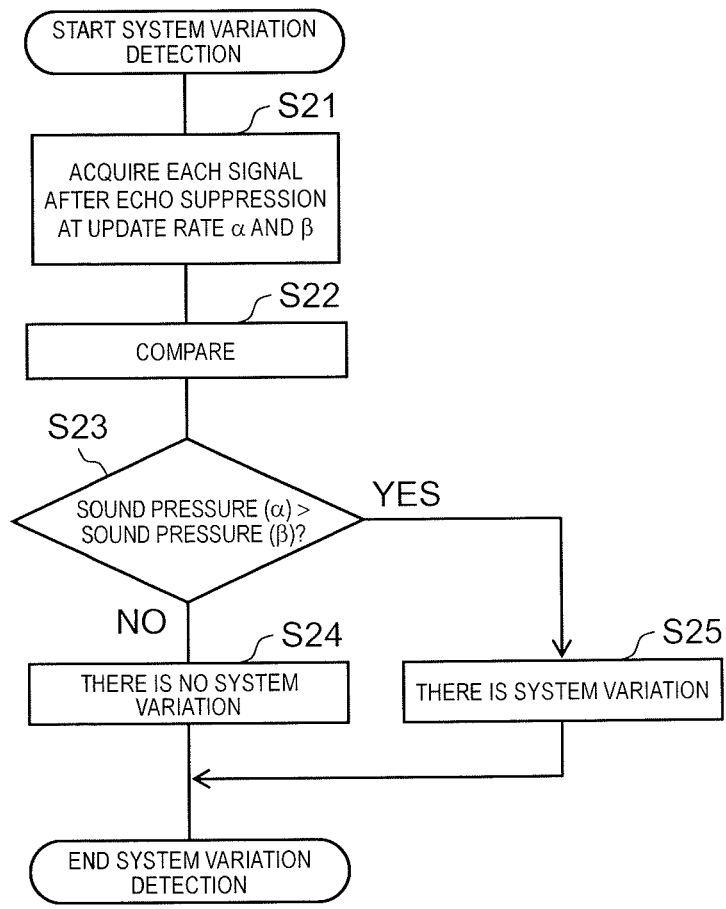
FIG. 5 is a flowchart showing in detail an example of a system variation detection procedure in step S11.

FIG. 5 is a flowchart showing in detail an example of the system variation detection procedure in step S11.

In FIG. 5, system variation detector 41 outputs the signal output from first echo suppression unit 20 (that is, signal after acoustic echo suppression at update rate α) and the signal output from second echo suppression unit 30 (that is, signal after acoustic echo suppression at update rate β) (S21).

System variation detector 41 compares the magnitude of the signal (sound pressure) after acoustic echo suppression at update rate α with the magnitude of the signal (sound pressure) after acoustic echo suppression at update rate β (S22).

As a result of the comparison, when the sound pressure at update rate α is smaller than the sound pressure at update rate β (S23), system variation detector 41 determines that there is no system variation (S24).

On the other hand, as a result of the comparison, when the sound pressure at update rate β is smaller than the sound pressure at update rate α (S23), system variation detector 41 determines that there is the system variation (S25).

After the processes of steps S24 and S25, system variation detector 41 ends the process shown in FIG. 5, and the process of DSP 10 proceeds to the original process (that is, step S12).

Figure 6:
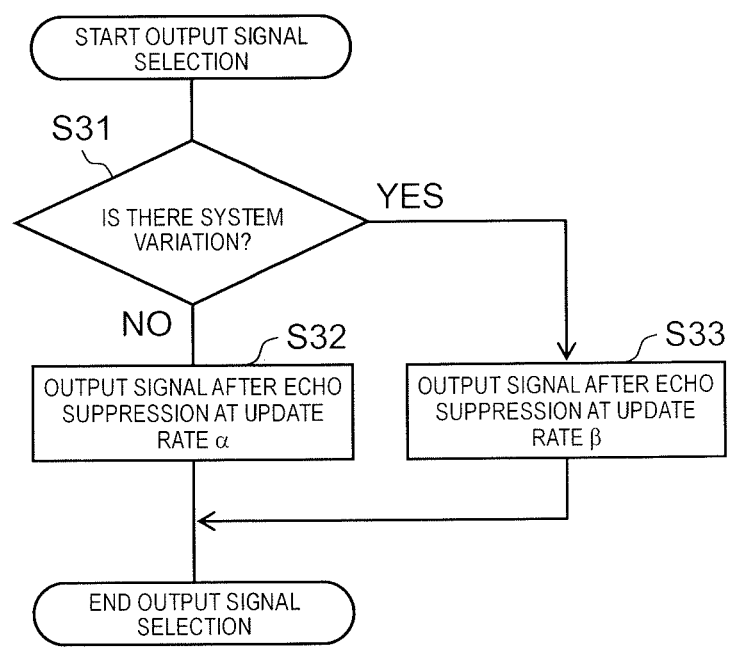
FIG. 6 is a flowchart showing in detail an example of an output signal selection procedure in step S12.

FIG. 6 is a flowchart showing in detail an example of the output signal selection procedure in step S12.

In FIG. 6, output signal selector 43 determines the presence or absence of the system variation based on the output from system variation detector 41 (S31).

When there is no system variation (S31, NO), output signal selector 43 outputs the signal after the acoustic echo suppression at update rate α to speaker sp2 (S32).

On the other hand, when there is the system variation (S31, YES), output signal selector 43 outputs the signal after the acoustic echo suppression at update rate β to speaker sp2 (S33).

When the signal after the acoustic echo suppression is input to speaker sp2 by the processes of steps S32 and S33, the voice with high sound quality is output from speaker sp2.

After the processes of steps S32 and S33, output signal selector 43 ends the process shown in FIG. 6, and the process of DSP 10 ends.

FIGS. 7A, 7B, 7C, 7D, and 7E are graphs showing an example of the growth process of adaptive filter 23 at the time of initial activation.

The vertical axis of each graph represents sound pressure, and the horizontal axis thereof represents frequency.

Figure 7A:
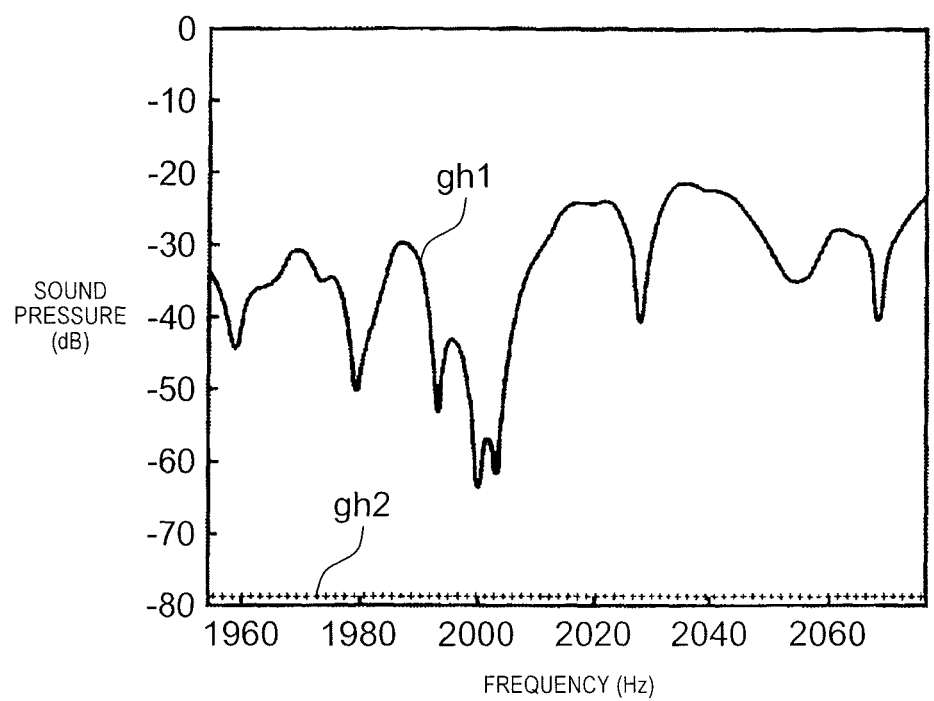
FIG. 7A is a graph showing an example of a growth process of an adaptive filter at the time of initial activation.

In the initial state at the time of the initial activation, as shown in FIG. 7A, adaptive filter 23 does not generate pseudo echo signal gh2 with respect to echo sound gh1 picked-up by microphone mc1.

Figure 7B:
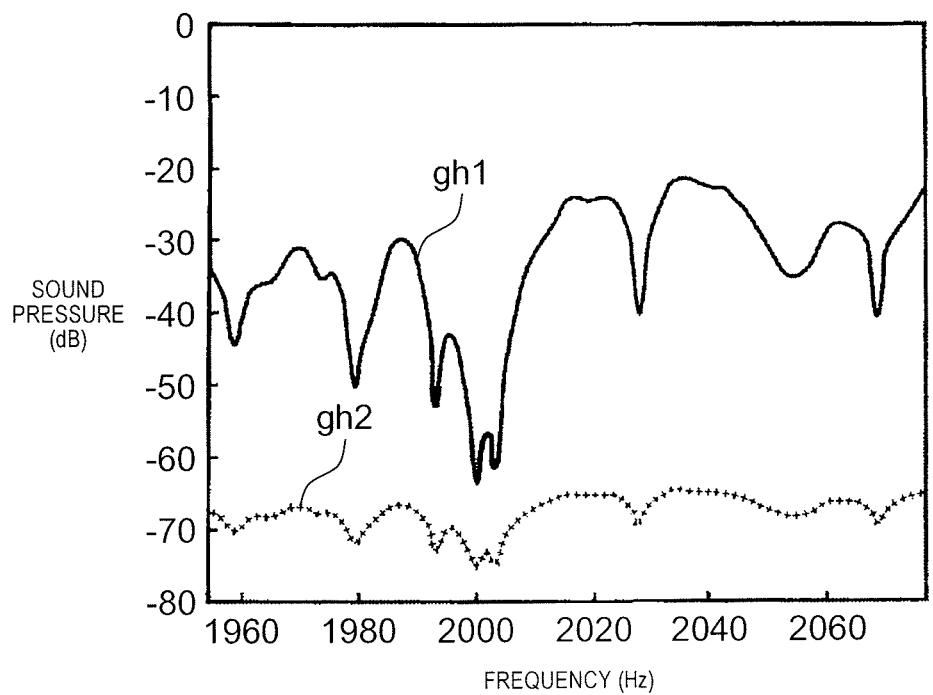
FIG. 7B is a graph showing an example of the growth process of the adaptive filter at the time of the initial activation.
Figure 7C:
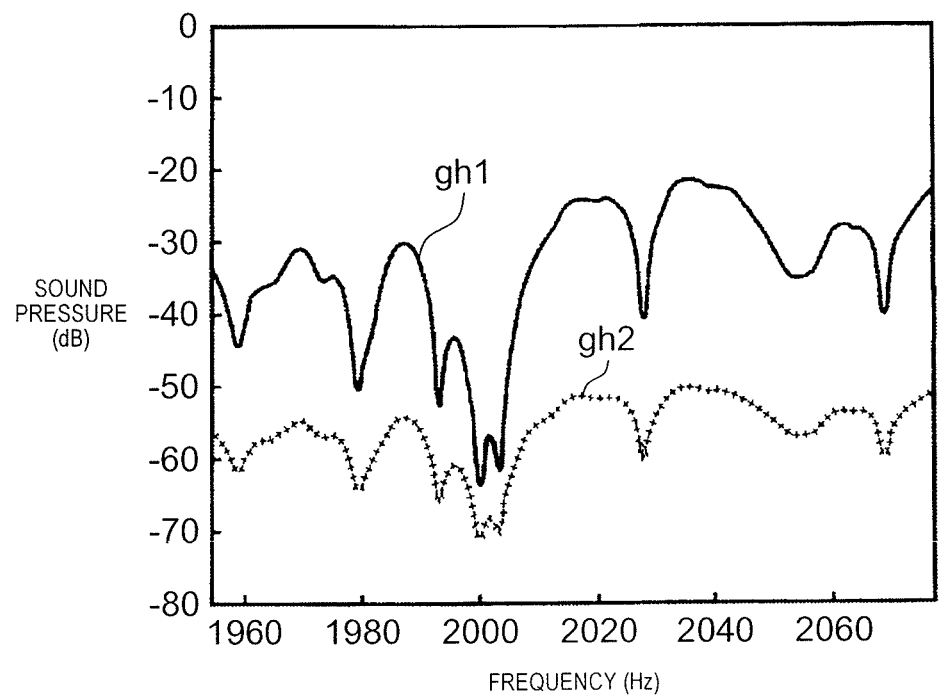
FIG. 7C is a graph showing an example of the growth process of the adaptive filter at the time of the initial activation.
Figure 7D:
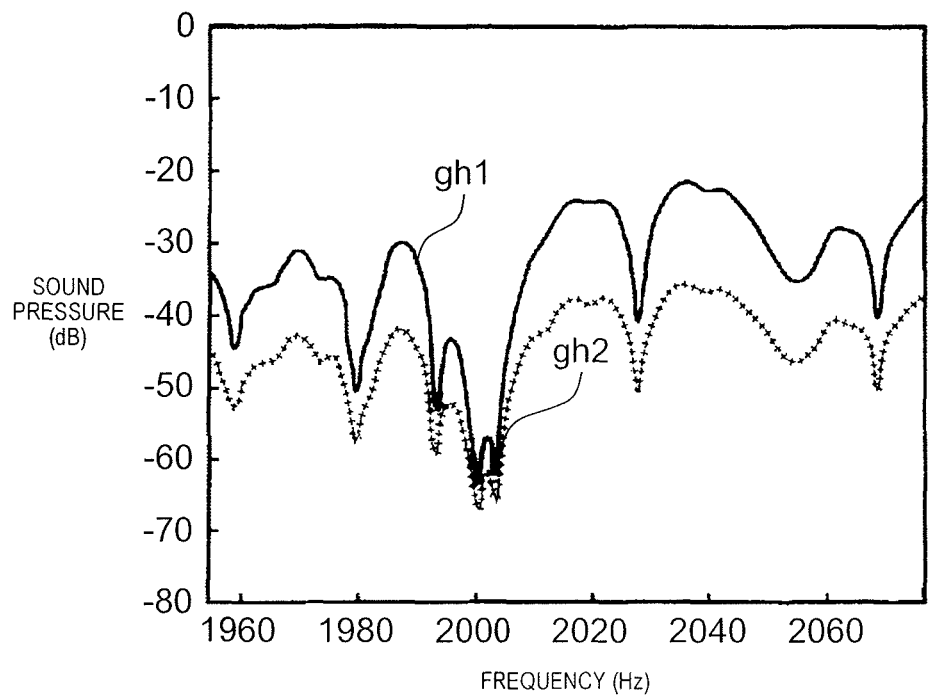
FIG. 7D is a graph showing an example of the growth process of the adaptive filter at the time of the initial activation.

Thereafter, as time passes, as shown in FIGS. 7B, 7C, and 7D, adaptive filter 23 grows (in other words, the filter coefficients of adaptive filter 23 are learned), and pseudo echo signal gh2 generated by adaptive filter 23 approaches echo sound gh1 picked-up by microphone mc1.

Figure 7E:
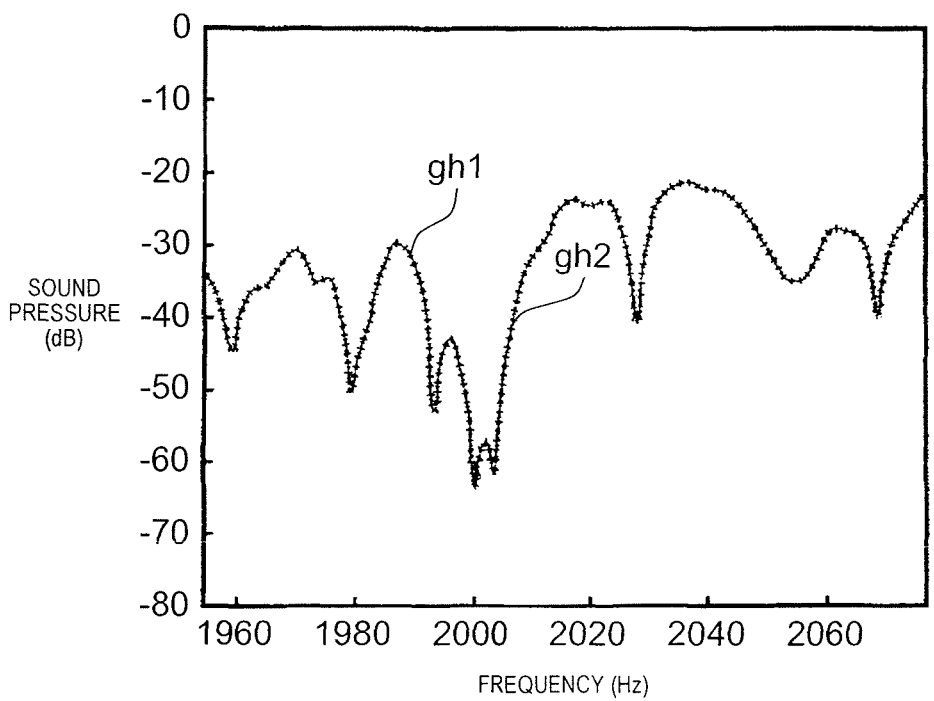
FIG. 7E is a graph showing an example of the growth process of the adaptive filter at the time of the initial activation.

In a stable state, as shown in FIG. 7E, pseudo echo signal gh2 generated by adaptive filter 23 substantially coincides with echo sound gh1 picked-up by microphone mc1.

It should be noted that, while FIGS. 7A to 7E show an example of the growth process of adaptive filter 23, the growth process of adaptive filter 33 is also like that of adaptive filter 23, although the growth rate is faster than that of adaptive filter 23.

Figure 8A:
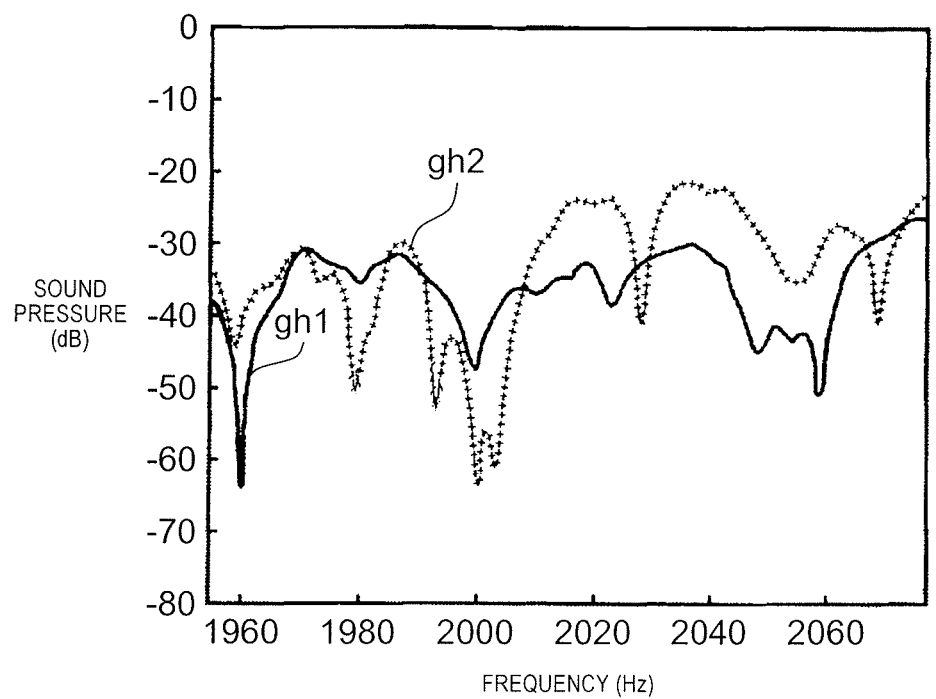
FIG. 8A is a graph showing an example of a change process of an adaptive filter at the time of system variation.
Figure 8B:
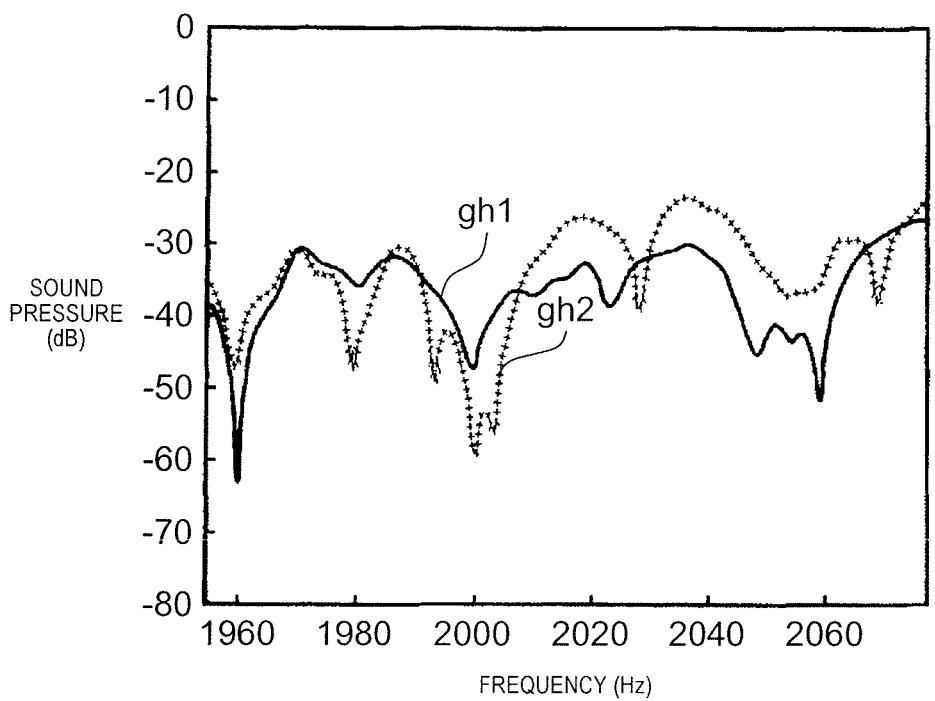
FIG. 8B is a graph showing an example of the change process of the adaptive filter at the time of system variation.
Figure 8C:
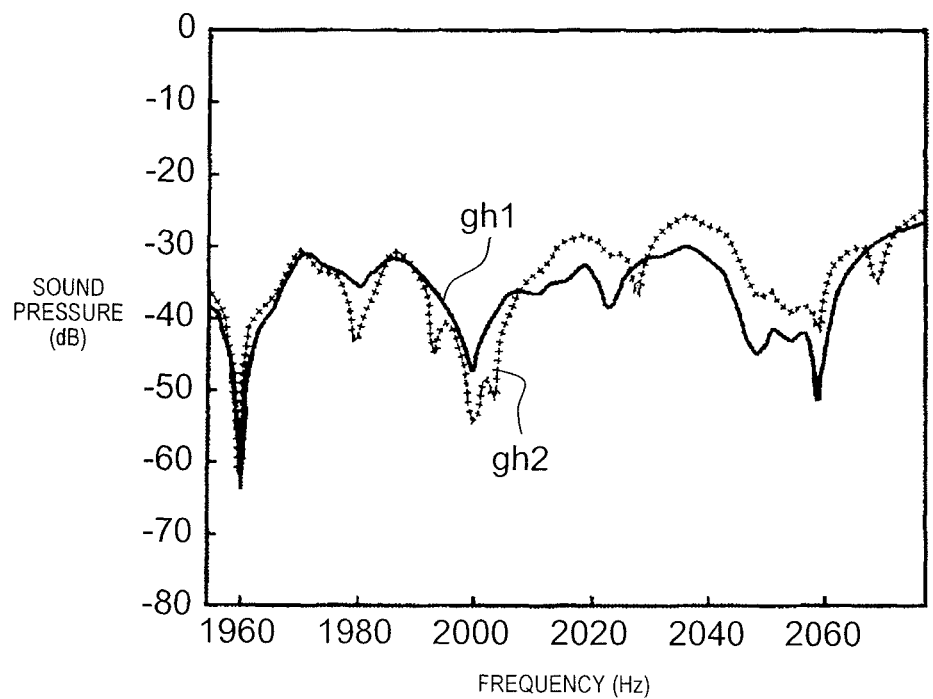
FIG. 8C is a graph showing an example of the change process of the adaptive filter at the time of system variation.

FIGS. 8A, 8B, 8C. 8D, and 8E are graphs showing an example of the change process of adaptive filter 23 at the time of respective system variation.

When the situation in vehicle compartment 8z changes (for example, opening or closing of a vehicle window, and the like) and the sound field varies suddenly, that is, when the system varies suddenly, pseudo echo signal gh2 generated by adaptive filter 23 deviates largely from echo sound gh1 picked-up by microphone mc1.

In FIG. 8A, there are many frequency bands at which the sound pressure of pseudo echo signal gh2 exceeds the sound pressure of echo sound gh1.

Figure 8D:
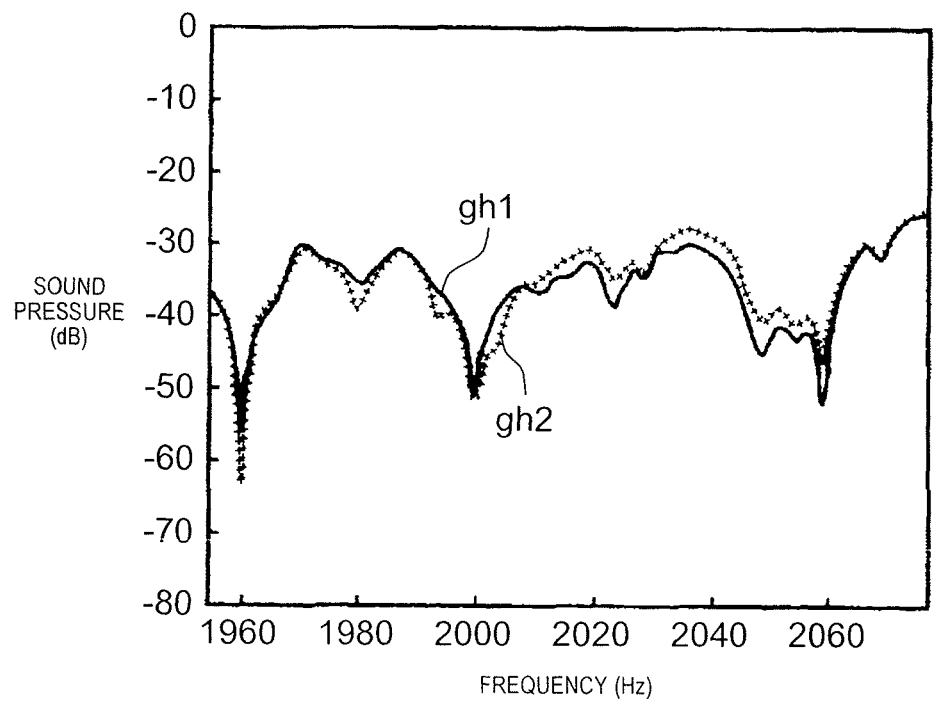
FIG. 8D is a graph showing an example of the change process of the adaptive filter at the time of system variation.

Thereafter, as time passes, as shown in FIGS. 8B, 8C, and 8D, adaptive filter 23 grows (in other words, the filter coefficients of adaptive filter 23 are learned), and pseudo echo signal gh2 generated by adaptive filter 23 approaches echo sound gh1 picked-up by microphone mc1.

Figure 8E:
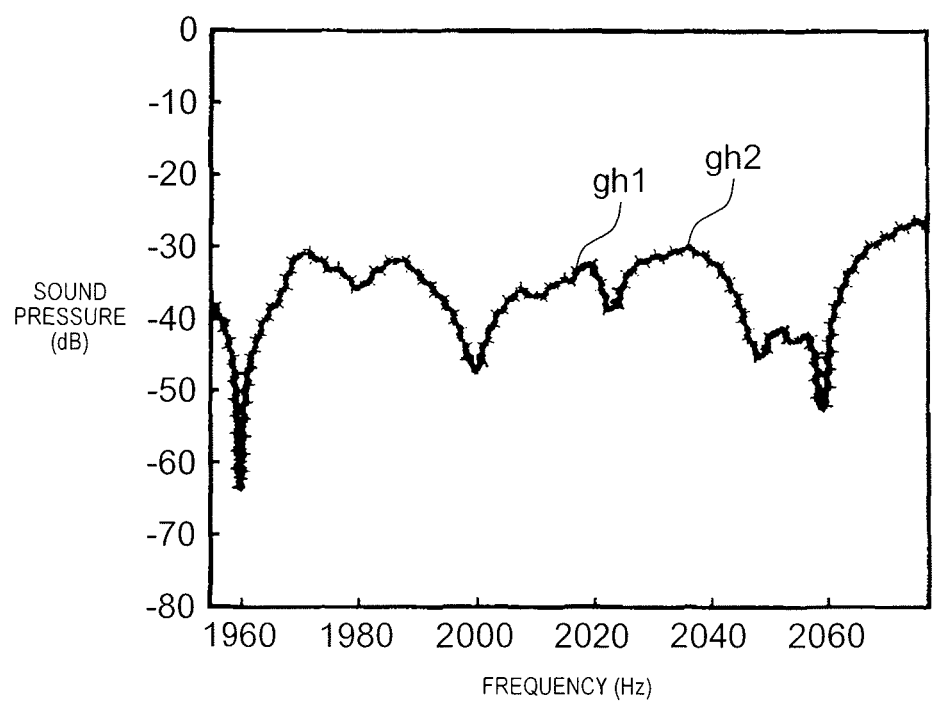
FIG. 8E is a graph showing an example of the change process of the adaptive filter at the time of system variation.

In a stable state in which a period of time has elapsed since the system variation occurred, as shown in FIG. 8E, pseudo echo signal gh2 generated by adaptive filter 23 substantially coincides with echo sound gh1 picked-up by microphone mc1.

It should be noted that, while FIGS. 8A to 8E show an example of the change process of adaptive filter 23, the change process of adaptive filter 33 is also like that of adaptive filter 23, although the change speed is faster than that of adaptive filter 23.

As described above, in acoustic echo suppression device 5 according to Exemplary Embodiment 1, microphone mc1 picks-up the voice of driver hm1 (person) in vehicle compartment 8z (in the environment).

First echo suppression unit 20 outputs a voice signal after the first echo suppression (first suppression voice signal) obtained by suppressing an echo component included in the voice signal based on the voice signal of driver hm1 picked-up by microphone mc1 and the voice signal after the first echo suppression (first reference signal) in the past stored in buffer memory 50A.

Second echo suppression unit 30 outputs a voice signal after the second echo suppression (second suppression voice signal) obtained by suppressing the echo component included in the voice signal based on the voice signal of driver hm1 picked-up by microphone mc1 and the voice signal after the second echo suppression (second reference signal) in the past stored in buffer memory 50B.

System variation detector 41 detects the presence or absence of the system variation (that is, variation of the environment).

Output signal selector 43 selects one of the voice signals after the first echo suppression and the voice signal after the second echo suppression according to a detection result of the presence or absence of the system variation, and causes speaker sp2 to output it.

As a result, even when there is a sudden system variation such as a change in the transmission characteristics of the sound field in the environment (for example, in vehicle compartment 8z), acoustic echo suppression device 5 may follow the system variation to suppress the sound quality deterioration of the voice output from the speaker (for example, speaker sp2).

In addition, by providing the two echo suppression units of first echo suppression unit 20 and second echo suppression unit 30, even when the operation of one of the echo suppression units is defective, the other echo suppression unit may be used, thereby continuing the acoustic echo suppression operation.

In addition, when the sound quality by the signal after the acoustic echo suppression is not sufficiently improved, it is also possible to enhance the sound quality by individually changing the update frequency of the two echo suppression units.

Further, update rate $\alpha$ of the filter coefficient of adaptive filter 33 included in second echo suppression unit 30 is slower update rate $\beta$ of the filter coefficient of adaptive filter 23 included in the first echo suppression unit 20.

As a result, when there is no system variation such as a change in the transmission characteristics of the sound field described above, acoustic echo suppression device 5 may stabilize the quality of the voice by outputting a voice signal after the acoustic echo suppression output from first echo suppression unit 20 having low update rate $\alpha$.

On the other hand, when there is the system variation such as a change in the transmission characteristics of the sound field described above, acoustic echo suppression device 5 may quickly follow the system variation to suppress the sound quality deterioration of the voice in the sound field after the system variation by outputting the voice signal after the acoustic echo suppression output from fast second echo suppression unit 30 with update rate $\beta$.

In addition, system variation detector 41 detects the presence or absence of the system variation based on the voice signal after the first echo suppression and the voice signal after the second echo suppression.

As described above, by using a voice signal obtained by suppressing the acoustic echo by the pseudo echo signal generated by using different adaptive filters to detect the presence or absence of the system variation, acoustic echo suppression device 5 may detect not only instantaneous system variation, but also continuous system variation that occur gradually over a predetermined time, for example.

In addition, since acoustic echo suppression device 5 does not need to separately prepare a device for detecting the presence or absence of the system variation, the system variation may be easily detected, thereby reducing the number of components and reducing the cost.

In addition, when the sound pressure of the voice signals after the first echo suppression (magnitude of the sound included in the first suppression voice signal) is larger than the sound pressure of the voice signals after the second echo suppression (magnitude of the sound included in the second suppression voice signal), system variation detector 41 detects that there is system variation.

As described above, acoustic echo suppression device 5 may simply detect the presence or absence of the system variation by comparing the sound pressure of the voice signals after acoustic echo suppression output from first echo suppression unit 20 with the sound pressure of the voice signals after acoustic echo suppression output from second echo suppression unit 30.

Further, in acoustic echo suppression device 5, the voice signal after the first echo suppression in the past (first reference signal) is stored in buffer memory 50A.

The voice signal after the second echo suppression in the past (second reference signal) is stored in buffer memory 50B.

As described above, adaptive filters 23 and 33 may easily generate a pseudo echo signal for suppressing an acoustic echo signal included in the voice signal picked-up by microphone mc1 by using the first reference signal and the second reference signal, which are voice signals after the acoustic echo suppression in the past (immediately before) stored in buffer memories 50A and 50B, respectively.

In addition, when system variation detector 41 detects that there is system variation, output signal selector 43 selects and outputs the voice signal after the first echo suppression, and when system variation detector 41 detects that there is no system variation, output signal selector 43 selects and outputs the voice signal after the second echo suppression.

As a result, acoustic echo suppression device 5 may satisfy both the stabilization of the sound quality of the voice when there is no system variation and the suppression of the sound quality deterioration of the voice when there is a system variation.

Exemplary Embodiment 2

In Exemplary Embodiment 1 described above, the case of using two adaptive filters is illustrated, but in Exemplary Embodiment 2, the case of using three adaptive filters is illustrated.

In addition, in an acoustic echo suppression device of Exemplary Embodiment 2, the same components as those of Exemplary Embodiment 1 are denoted by the same reference numerals, and the description thereof will not be repeated.

Figure 9:
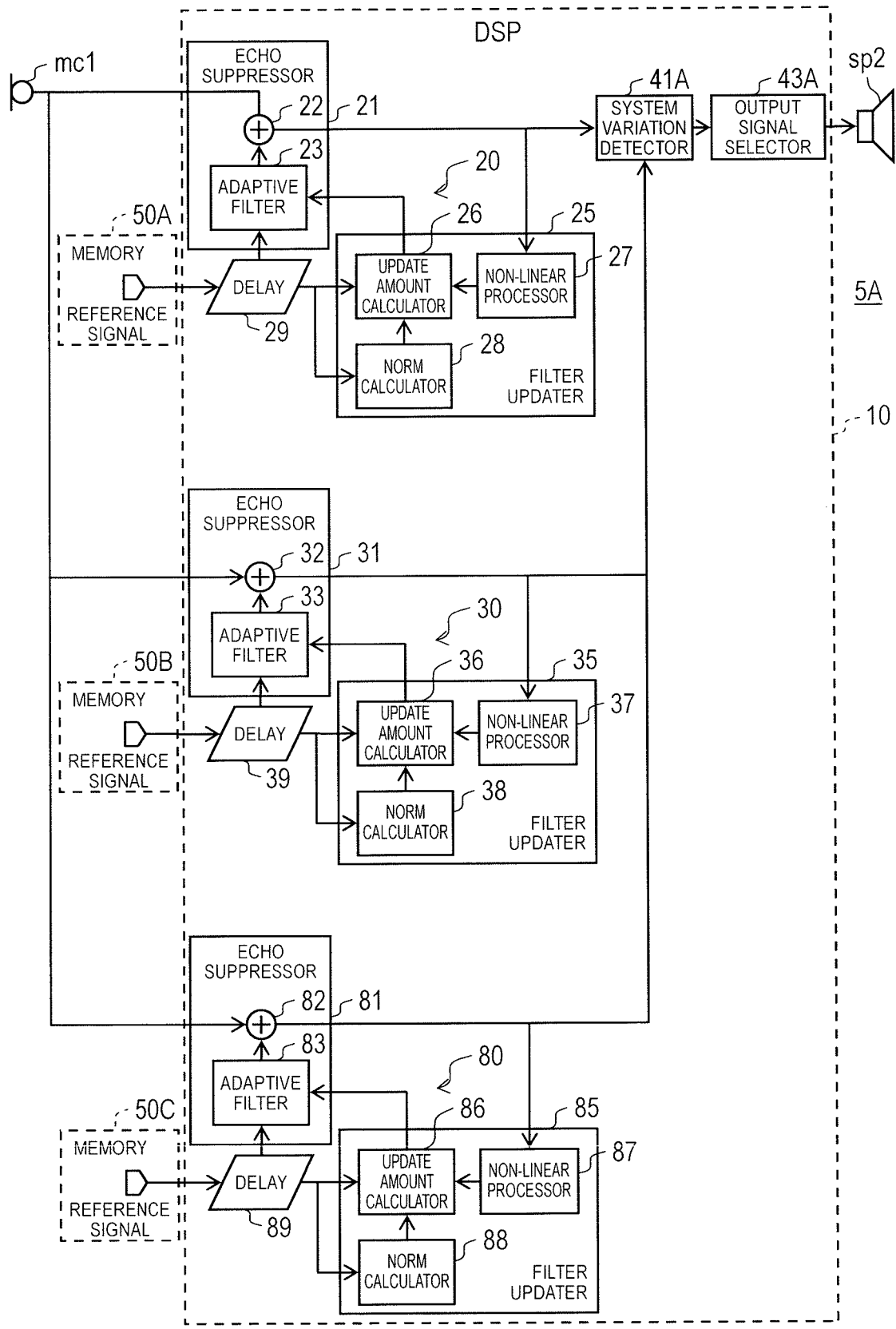
FIG. 9 is a block diagram showing in detail an example of a functional configuration of an acoustic echo suppression device according to Exemplary Embodiment 2.

FIG. 9 is a block diagram showing in detail an example of a functional configuration of acoustic echo suppression device 5A according to Exemplary Embodiment 2.

Acoustic echo suppression device 5A includes third echo suppression unit 80 in addition to first echo suppression unit 20 and second echo suppression unit 30 illustrated in Exemplary Embodiment 1.

Like first echo suppression unit 20 and second echo suppression unit 30, third echo suppression unit 80 as an example of the third filter processor includes third echo suppressor 81, third filter updater 85, and delay 89.

However, update rate $\gamma$ of the filter coefficient of adaptive filter 83 of third echo suppression unit 80 is set to be the fastest as compared with update rate $\alpha$ of the filter coefficient of adaptive filter 23 of first echo suppression unit 20 and update rate $\beta$ of the filter coefficient of adaptive filter 33 of second echo suppression unit 30.

That is, first echo suppression unit 20 outputs a signal after stable acoustic echo suppression with update rate $\alpha$ slower than update rate $\gamma$ or $\beta$, when the characteristics of the sound field are not changed significantly.

In addition, second echo suppression unit 30 outputs the signal after fast acoustic echo suppression with update rate $\beta$ faster than update rate $\alpha$ so as to be able to follow the system variation when the characteristic of the sound field changes (for example, when there is a sudden system variation).

Furthermore, third echo suppression unit 80 outputs the signal after fast acoustic echo suppression with update rate $\gamma$ faster than update rate $\alpha$ and $\beta$ so as to be able to follow the system variation at the fastest when the characteristic of the sound field changes largely (for example, when there is a sudden system variation).

The third echo suppressor 81 includes adder 82 and adaptive filter 83, and performs the processing of acoustic echo suppression by adding the pseudo echo signal generated by adaptive filter 83 to the voice picked-up by microphone mc1 by adder 82 in order to cancel an acoustic echo included in the voice picked-up by microphone mc1.

Third echo suppressor 81 outputs the output of adder 82 (in other words, the signal after acoustic echo suppression (echo suppression signal)) to system variation detector 41.

Adaptive filter 83 receives the third reference signal delayed by the delay time by delay 89 (that is, delay device), grows into a filter having a characteristic equivalent to the transmission characteristics until the reproduced sound output from speaker sp2 is picked-up, and performs signal processing by using this filter to generate a pseudo echo signal.

As described above, the third reference signal is stored in buffer memory 50C and a signal (speaker signal) after past acoustic echo suppression (strictly speaking, the timing from the current time to the immediately preceding time) to be output from speaker sp2, and a signal before the time required for the voice output from speaker sp2 to reach microphone mc1.

Therefore, the timing at which the third reference signal is delayed by delay 89 and input to adaptive filter 83 coincides with the timing at which the reproduced sound output from speaker sp2 is picked-up by microphone mc1 as an echo sound.

Therefore, the delay time of delay 89 is a value obtained by dividing the distance between speaker sp2 and microphone mc1 by the rate of sound, and is equal to the delay time of delays 29 and 39.

Third filter updater 85 controls the number of taps and the coefficients of the FIR filter so that the characteristic of adaptive filter 83 is equivalent to the echo transmission characteristic, and includes update amount calculator 86, non-linear processor 87 and norm calculator 88.

It should be noted that the filter characteristics may be changed by controlling the number of taps of the FIR filter.

Non-linear processor 87 performs non-linear conversion on the signal after the acoustic echo suppression, generates a non-linearly converted echo suppression signal and outputs it to update amount calculator 86 to determine whether to change the filter characteristic in the positive direction or in the negative direction.

Norm calculator 88 calculates the norm of the speaker signal.

The norm of the speaker signal is the sum of the magnitudes of the speaker signal within a predetermined time in the past, and is a value indicating the degree of the magnitude of the signal within this time.

Update amount calculator 86 calculates the update amount of the filter characteristic using the norm calculated by norm calculator 88, an echo suppression signal non-linearly converted by non-linear processor 87, and the third reference signal (speaker signal) delayed by the delay time by delay 89.

System variation detector 41A receives the signal after acoustic echo suppression output from first echo suppression unit 20 (first suppression voice signal), the signal after acoustic echo suppression output from second echo suppression unit 30 (second suppression voice signal), and a signal after acoustic echo suppression output from third echo suppression unit 80 (third suppression voice signal).

Based on these signals, system variation detector 41A detects whether the transmission characteristics of sound in the sound field are varied, that is, detects the presence or absence of the system variation.

When system variation detector 41A determines that there is no system variation, the magnitude (for example, sound pressure) of the output signal from first echo suppression unit 20 that updates the filter characteristics at slow update rate $\alpha$ is small as compared with the magnitude (for example, sound pressure) of the output signal from second echo suppression unit 30 that updates the filter characteristics at fast update rate $\beta$ and the magnitude (for example, sound pressure) of the output signal from third echo suppression unit 80 that updates the filter characteristics at fastest update rate $\gamma$.

On the other hand, when system variation detector 41A determines that there is system variation, the magnitude (for example, sound pressure) of the output signal from first echo suppression unit 20 that updates the filter characteristics at slow update rate $\alpha$ is large as compared with the magnitude (for example, sound pressure) of the output signal from second echo suppression unit 30 that updates the filter characteristics at fast update rate $\beta$ and the magnitude (for example, sound pressure) of the output signal from third echo suppression unit 80 that updates the filter characteristics at fastest update rate $\gamma$.

Therefore, when it is determined that the magnitude of the output signal from second echo suppression unit 30 and the magnitude of the output signal from third echo suppression unit 80 are smaller than the magnitude of the output signal from first echo suppression unit 20, system variation detector 41A determines that there is system variation.

Furthermore, when determining that there is system variation, system variation detector 41A compares the magnitude of the output signal from second echo suppression unit 30 with the magnitude of the output signal of third echo suppression unit 80, and when the magnitude of the output signal from second echo suppression unit 30 is small as a result of the comparison, system variation detector 41A detects a system variation corresponding to second echo suppression unit 30 (for example, large system variation).

On the other hand, when the magnitude of the output signal from third echo suppression unit 80 is small as a result of the comparison, system variation detector 41A detects a system variation corresponding to third echo suppression unit 80 (for example, extremely large system variation).

When there is no system variation, output signal selector 43A outputs the signal after acoustic echo suppression output from first echo suppression unit 20 to speaker sp2.

On the other hand, when there is the system variation, output signal selector 43A outputs the signal after acoustic echo suppression output from second echo suppression unit 30 or a signal after acoustic echo suppression output from third echo suppression unit 80 to speaker sp2 according to the degree of system variation.

An operation of acoustic echo suppression device 5A according to this embodiment described above is illustrated.

Figure 10:
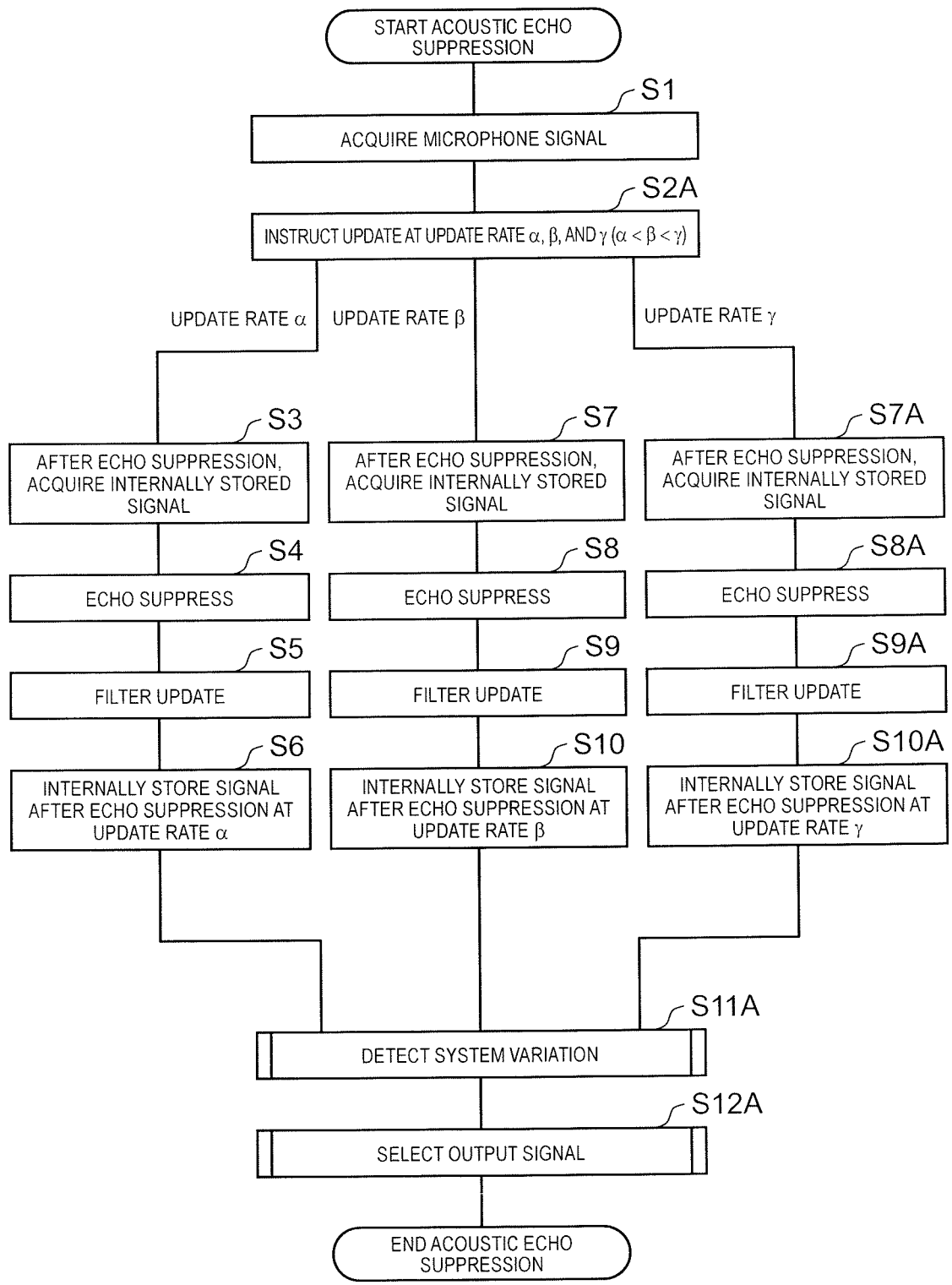
FIG. 10 is a flowchart showing in detail an example of an acoustic echo suppression operation procedure.

FIG. 10 is a flowchart showing in detail an example of the acoustic echo suppression operation procedure.

The same step numbers are assigned to the same step process as that of Exemplary Embodiment 1 in FIG. 4, and a description thereof will not be repeated.

In FIG. 10, DSP 10 acquires the voice picked-up by microphone mc1 in step S1, and then determines whether or not the current time is the timing corresponding to update rate $\alpha$, $\beta$, and $\gamma$ of the filter coefficient of each of adaptive filters 23, 33, and 83.

When it is the update timing, DSP 10 instructs at least one of first echo suppression unit 20, second echo suppression unit 30, and third echo suppression unit 80 having the corresponding adaptive filter at the update timing to execute the process of updating the filter coefficient (S2A).

In other words, DSP 10 instructs each of first echo suppression unit 20, second echo suppression unit 30, and third echo suppression unit 80 to execute the process of updating the filter coefficient in parallel in time (S2A).

As described above, when the current time is the timing of update rate $\alpha$, DSP 10 executes the process of updating the filter coefficient of adaptive filter 23 of first echo suppression unit 20 in the processes after step S3.

When the current time is the timing of update rate $\beta$, DSP 10 executes the process of updating the filter coefficient of adaptive filter 33 of second echo suppression unit 30 in the processes after step S7.

When the current time is the timing of update rate $\gamma$, DSP 10 executes the process of updating the filter coefficient of adaptive filter 83 of third echo suppression unit 80 in the processes after step S7A.

In this embodiment, since there is a relationship of update rate $\alpha$<update rate $\beta$<update rate $\gamma$, the update frequency is higher in the order of the process of steps S3 to S6, the process of steps S7 to S10, and the process of steps S7A to S10A.

The update operation at the timing of update rate $\alpha$ and update rate $\beta$ is as described above in Exemplary Embodiment 1.

At the timing of update rate $\gamma$, third echo suppressor 81 acquires the third reference signal (internal stored signal), which is a signal (speaker signal) after acoustic echo suppression in the past, stored in buffer memory 50C (S7A).

Third echo suppressor 81 generates a pseudo echo signal by adaptive filter 83 by using the third reference signal delayed by a predetermined time by delay 89 and adds the pseudo echo signal to the voice signal picked-up by microphone mc1, in adder 82.

As a result, third echo suppressor 81 generates a signal after the acoustic echo suppression by subtracting (minus) the difference of the pseudo echo signal from the voice signal picked-up by microphone mc1 (S8A).

Third filter updater 85 calculates the update amount of the filter characteristic by using the signal after acoustic echo suppression and the delayed third reference signal, and updates the characteristic of adaptive filter 83 (S9A).

Third echo suppression unit 80 causes buffer memory 50C to store the signal after acoustic echo suppression generated in step S8A in order to use it as the third reference signal at the time of the next updating process of the filter coefficient (that is, the next update timing based on update rate $\gamma$) (S10A).

System variation detector 41A determines whether or not the environment (sound field) in vehicle compartment 8z is changed, when there is a system variation, and further determines the degree of the system variation (S11A).

The process of detecting the system variation will be described in detail below.

Output signal selector 43 selects a voice signal to be output to speaker sp2 according to the presence or absence of the system variation and the degree of the system variation (S12A).

The output signal selection process will be described in detail below.

After this, DSP 10 ends the process shown in FIG. 10.

Figure 11:
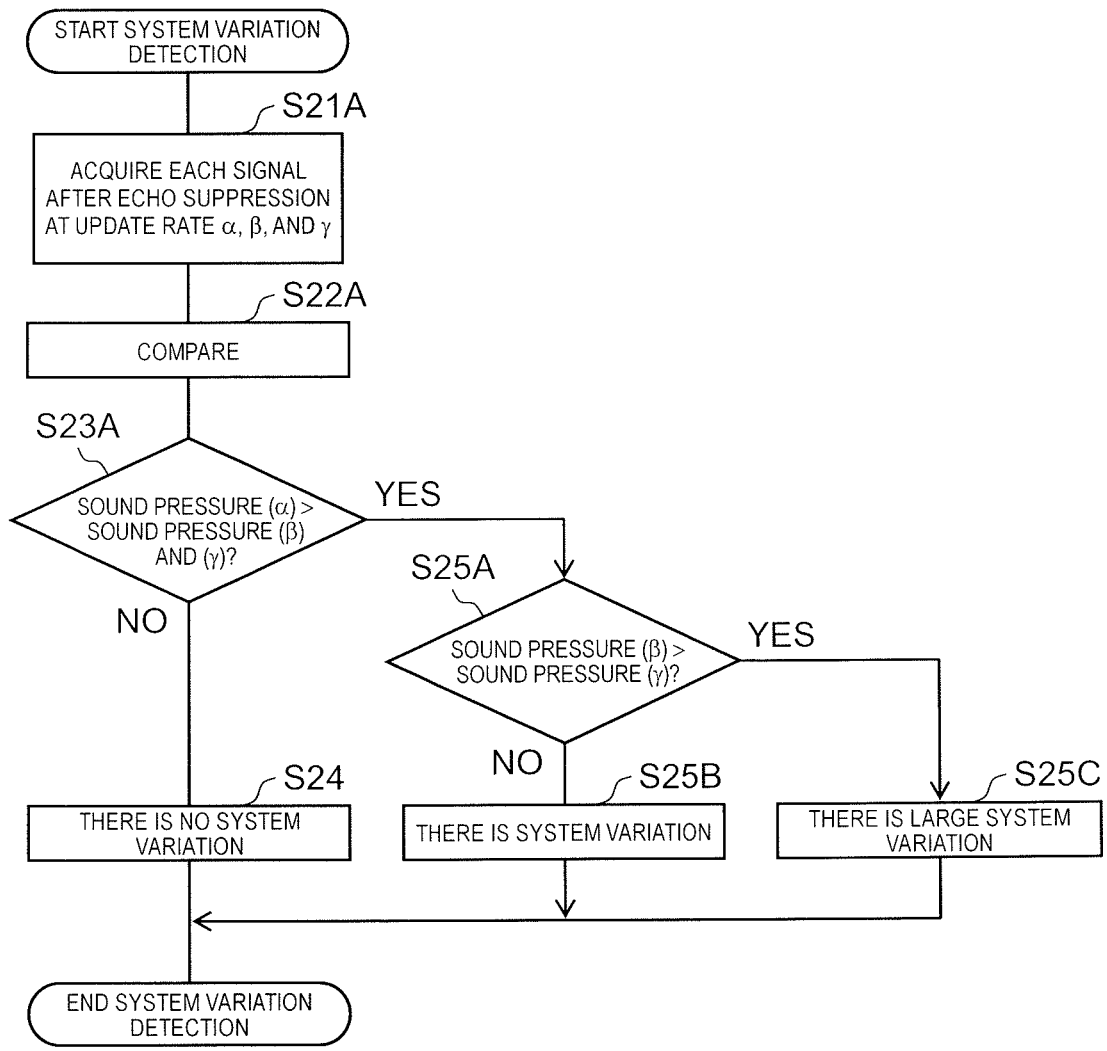
FIG. 11 is a flowchart showing in detail an example of a system variation detection procedure in step S11A.

FIG. 11 is a flowchart showing in detail an example of the system variation detection procedure in step S11A.

The same step numbers are attached to the same step process as that of Exemplary Embodiment 1.

In FIG. 11, system variation detector 41A acquires a signal output from first echo suppression unit 20 (that is, signal after acoustic echo suppression at update rate α), a signal output from second echo suppression unit 30 (that is, signal after acoustic echo suppression at update rate β) and a signal output from third echo suppression unit 80 (that is, signal after acoustic echo suppression at update rate γ) (S21A).

System variation detector 41A compares the magnitude of the signal (sound pressure) after acoustic echo suppression at update rate α, the magnitude of the signal (sound pressure) after acoustic echo suppression at update rate β, and the magnitude of the signal (sound pressure) after acoustic echo suppression at update rate γ (S22A).

As a result of the comparison, when the sound pressure at update rate α is smaller than the sound pressure at update rate β and the sound pressure at update rate γ (S23A, NO), system variation detector 41A determines that there is no system variation (S24).

On the other hand, when the sound pressure at update rate β and the sound pressure at update rate γ are smaller than the sound pressure at update rate α (S23A, YES), system variation detector 41A further determines whether the sound pressure at update rate β is larger than the sound pressure at update rate γ (S25A).

When the sound pressure at update rate β is smaller than the sound pressure at update rate γ (S25A, NO), system variation detector 41A determines that there is system variation as in Exemplary Embodiment 1 (S25B).

On the other hand, when the sound pressure at update rate β is larger than the sound pressure at update rate γ (S25A, YES), system variation detector 41A detects the presence of an extremely large system variation (S25C).

After the processes of steps S24. S25B, and S25C, system variation detector 41A ends the process of FIG. 11, and the process of DSP 10 proceeds to the original process (that is, step S12A).

Figure 12:
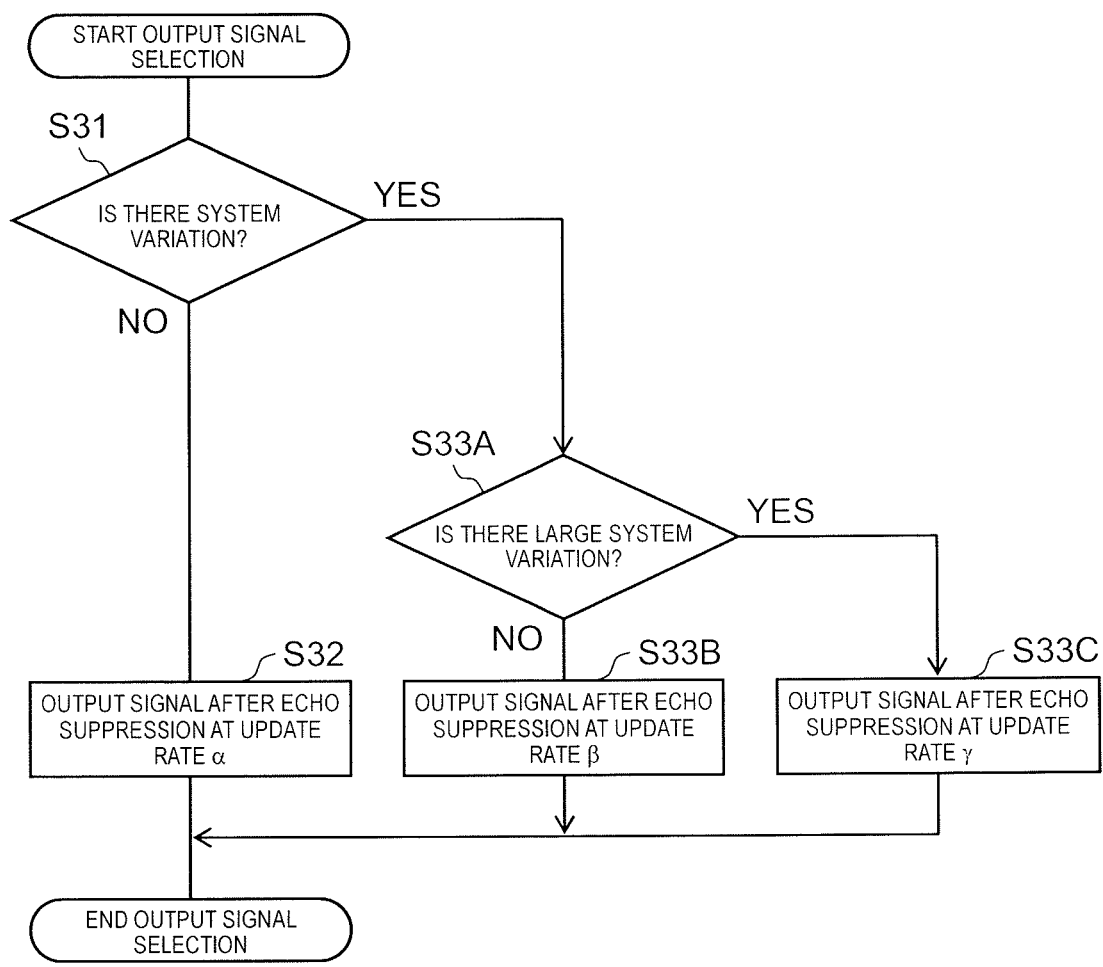
FIG. 12 is a flowchart showing in detail an example of an output signal selection procedure in step S12A.

FIG. 12 is a flowchart showing in detail an example of the output signal selection procedure in step S12A.

The same step numbers are attached to the same step process as that of Exemplary Embodiment 1.

In FIG. 12, output signal selector 43A determines the presence or absence of system variation based on the output from system variation detector 41A (S31).

When there is no system variation (S31, NO), output signal selector 43A outputs the signal after the acoustic echo suppression at update rate α to speaker sp2 (S32).

On the other hand, when there is system variation (S31, YES), output signal selector 43A determines whether or not the system variation is large (S33A).

When the system variation is not large (S33A, NO), output signal selector 43A outputs the signal after the acoustic echo suppression at update rate β to speaker sp2 (S33B) as in Exemplary Embodiment 1.

On the other hand, when the system variation is large (S33A, YES), output signal selector 43A outputs the signal after the acoustic echo suppression at update rate γ to speaker sp2 (S33C).

When the signal after acoustic echo suppression is input to speaker sp2 by the processes of steps S32, S33B, and S33C, the voice with high sound quality is output from speaker sp2.

After the processes of steps S32, S33B, and S33C, output signal selector 43A ends the process shown in FIG. 12, and the process of DSP 10 ends.

As described above, in acoustic echo suppression device 5A of Exemplary Embodiment 2, third echo suppression unit 80 outputs a voice signal after the third echo suppression (third suppression voice signal) obtained by suppressing echo component included in the voice signal based on the voice signal of driver hm1 picked-up by microphone mc1 and the voice signal after echo suppression in the past (third reference signal) stored in buffer memory 50C.

System variation detector 41A detects the presence or absence of the system variation.

Output signal selector 43A selects one of the first echo suppression signal, the second suppression voice signal), and the third suppression voice signal according to a detection result of the presence or absence of the system variation, and causes speaker sp2 to output it.

As a result, when there is a system variation such as a change in the transmission characteristics of the sound field in the environment (for example, in vehicle compartment 8z), for a relatively smaller system variation, acoustic echo suppression device 5 outputs a voice signal after the acoustic echo suppression output from second echo suppression unit 30 with fast update rate β, and for a relatively larger system variation, outputs a voice signal after the acoustic echo suppression output from third echo suppression unit 80 with fastest update rate γ.

Therefore, acoustic echo suppression device 5 may output voice suitable for the magnitude of the system variation in consideration of the stabilization of the quality of the voice and the suppression of the quality deterioration.

Exemplary Embodiment 3

In Exemplary Embodiments 1 and 2, a case of detecting the system variation by using the voice picked-up by microphone mc1 is illustrated, but in Exemplary Embodiments 3, a case of detecting the system variation by using the image captured by the camera is illustrated.

In addition, the acoustic echo suppression device of Exemplary Embodiment 3 has substantially the same configuration as that of Exemplary Embodiment 1.

The same components as those of Exemplary Embodiment 1 are denoted by the same reference numerals, and the description thereof will not be repeated.

Figure 13:
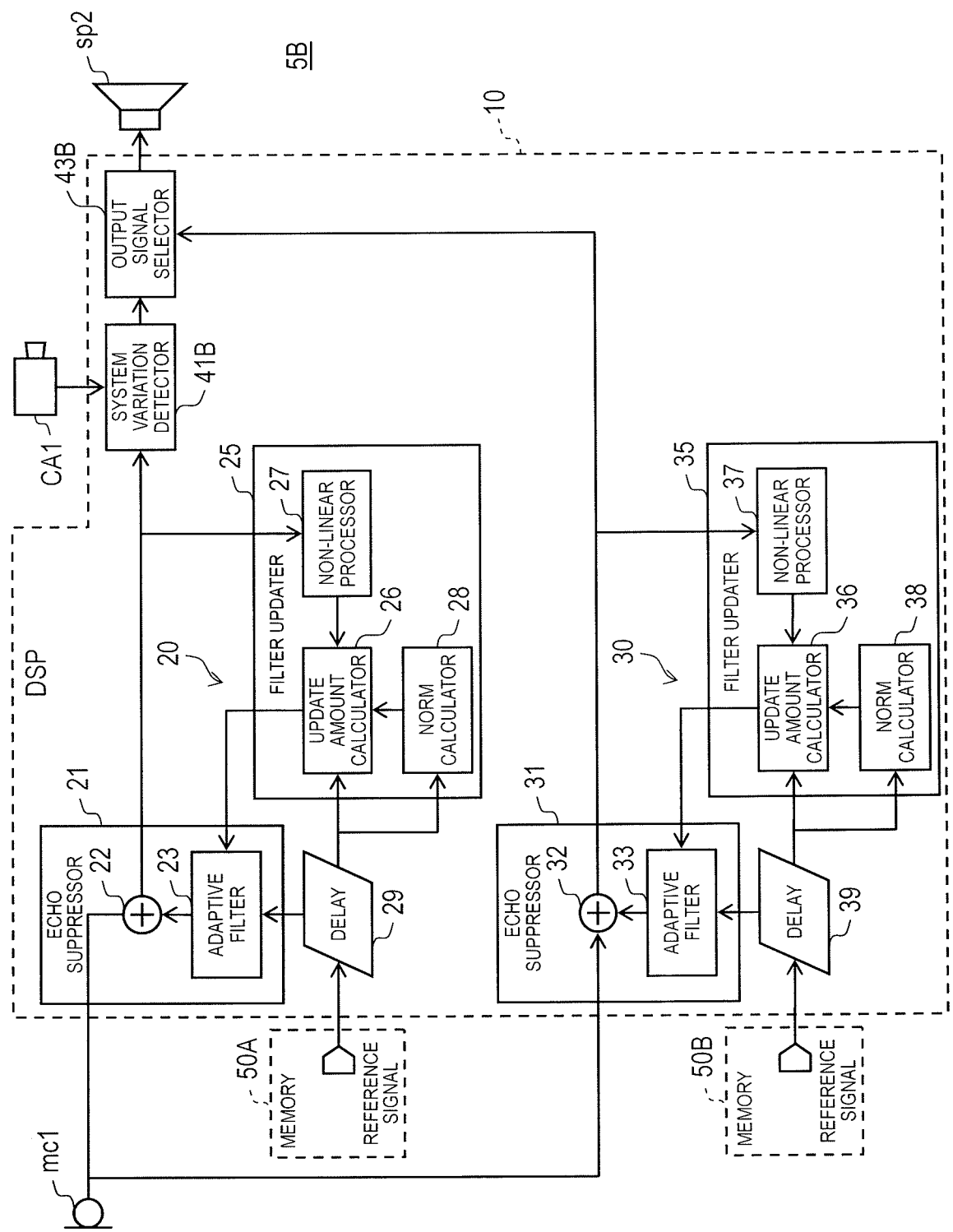
FIG. 13 is a block diagram showing in detail an example of a functional configuration of an acoustic echo suppression device according to Exemplary Embodiment 3.

FIG. 13 is a block diagram showing in detail an example of a functional configuration of acoustic echo suppression device 5B according to Exemplary Embodiment 3.

Acoustic echo suppression device 5B includes first echo suppression unit 20 and second echo suppression unit 30, as in Exemplary Embodiment 1.

When obtaining the detection result that there is no system variation, acoustic echo suppression device 5B outputs the output signal from first echo suppression unit 20 in which the filter characteristic of adaptive filter 23 is updated at update rate α, to speaker sp2.

On the other hand, when obtaining the detection result that there is system variation, acoustic echo suppression device 5B outputs the output signal from second echo suppression unit 30 in which the filter characteristic of adaptive filter 33 is updated at update rate β, to speaker sp2.

Unlike Exemplary Embodiment 1, acoustic echo suppression device 5B is disposed in vehicle compartment 8z, and includes camera CA1 which images the inside of the environment (that is, sound field) where acoustic echo is transmitted, and system variation detector 41B that detects a change in transmission characteristics of sound in the sound field (that is, system variation) by analyzing the image captured by camera CA1.

For example, camera CA1 may be an omnidirectional camera capable of imaging in an omnidirectional, which is installed on the ceiling in vehicle compartment 8z, and may be a camera with a built-in drive recorder capable of imaging the space in vehicle compartment 8z from the front side, which is installed at the upper portion of the windshield in front of the driver's seat.

Alternatively, camera CA1 may be a camera capable of imaging the space in vehicle compartment 8z from the rear side, which is installed at the upper portion of the back window in vehicle compartment 8z.

Camera CA1, first echo suppression unit 20, and output signal selector 43B are connected to system variation detector 41B.

As a result of analyzing an image captured by camera CA1, system variation detector 41B determines that there is system variation when a change in a situation such as a vehicle window is opened and closed, a seat is tilted, a passenger moves the face largely, and a door is opened during the stop is captured in an image.

When determining that there is system variation, system variation detector 41B blocks the signal output from first echo suppression unit 20, and notifies output signal selector 43B of a detection signal of the presence of system variation, for example.

Output signal selector 43B outputs a signal output from second echo suppression unit 30 to speaker sp2 when there is the system variation.

It should be noted that, when it is determined that there is system variation, system variation detector 41B blocks the signal output from first echo suppression unit 20, although it may pass the signal through without blocking, or output signal selector 43B may block the signal output from first echo suppression unit 20.

On the other hand, when not detecting the system variation as a result of analyzing the image captured by camera CA1, system variation detector 41B passes the signal output from first echo suppression unit 20 as it is, and notifies output signal selector 43B of a detection signal of the absence of system variation.

When receiving the notification that there is no system variation, output signal selector 43B outputs the signal output from first echo suppression unit 20 to speaker sp2.

In acoustic echo suppression device 5B according to Exemplary Embodiment 3, system variation detector 41B detects the presence or absence of system variation based on an image captured by camera CA1 that images vehicle compartment 8z.

As a result, it is possible to reliably detect instantaneous system variation.

Modification of Exemplary Embodiment 3

Figure 14:
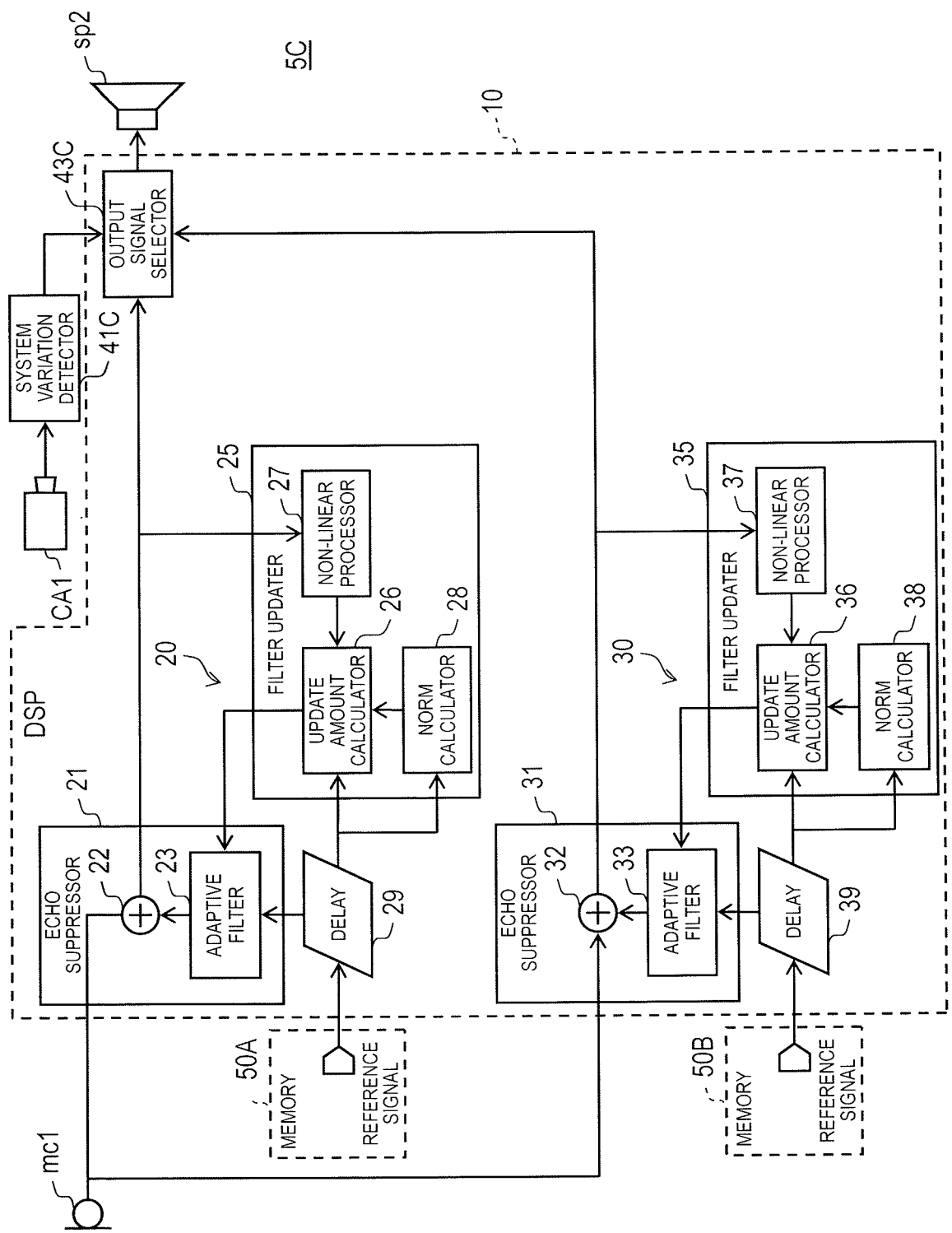
FIG. 14 is a block diagram showing in detail an example of a functional configuration of an acoustic echo suppression device according to a modification of Exemplary Embodiment 3.

FIG. 14 is a block diagram showing in detail an example of a functional configuration of acoustic echo suppression device 5C according to Exemplary Embodiment 3.

In acoustic echo suppression device 5C of this modification, camera CA1 and output signal selector 43B are connected to system variation detector 41C provided outside.

As a result of analyzing the image captured by camera CA1, system variation detector 41C determines the presence or absence of a system variation, and notifies output signal selector 43C of indicating that there is a system variation when obtaining the detection result that there is system variation.

When receiving a notification indicating that there is system variation from system variation detector 41C, output signal selector 43C blocks the signal output from first echo suppression unit 20 and outputs the signal output from second echo suppression unit 30 to speaker sp2.

On the other hand, when receiving a notification indicating that there is no system variation from system variation detector 41C, output signal selector 43C blocks the signal output from second echo suppression unit 30 and outputs the signal output from first echo suppression unit 20 to speaker sp2.

In acoustic echo suppression device 5C according to this modification, system variation detector 41C may be separated from acoustic echo suppression device 5C and may be provided on camera CA1 side, and so that the configuration of the acoustic echo suppression device may be simplified.

For example, camera CA1 may incorporate system variation detector 41C.

It should be noted that, also in Exemplary Embodiment 3 and the present modification, as in Exemplary Embodiment 2, the first, second and third echo suppression units may be used to output the signal after acoustic echo suppression.

Exemplary Embodiment 4

Exemplary Embodiments 4 shows a case of detecting the system variation by using three or more microphones.

In addition, the acoustic echo suppression device of Exemplary Embodiment 4 has substantially the same configuration as that of Exemplary Embodiment 1.

The same components as those of Exemplary Embodiment 1 are denoted by the same reference numerals, and the description thereof will not be repeated.

Figure 15:
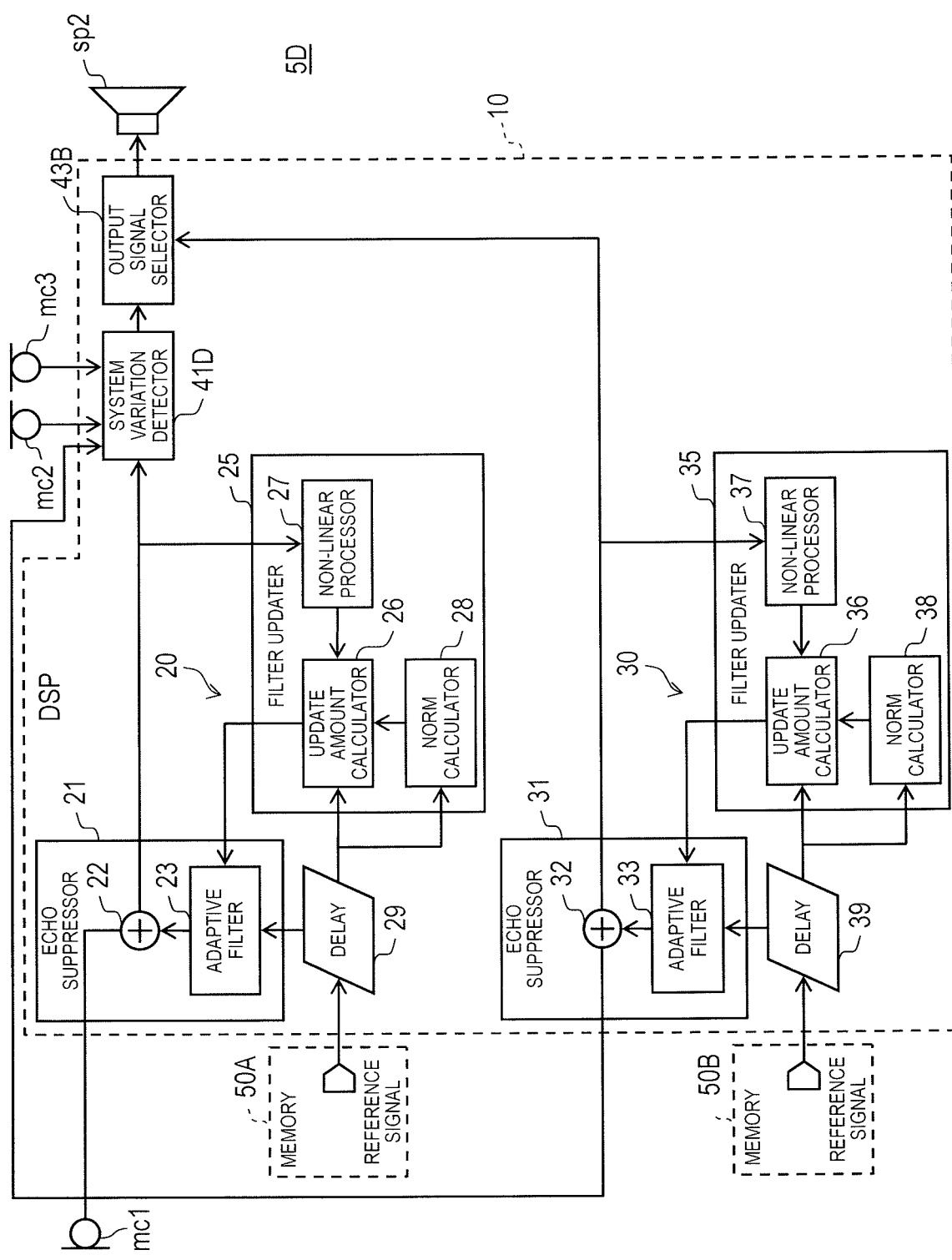
FIG. 15 is a block diagram showing in detail an example of a functional configuration of an acoustic echo suppression device according to Exemplary Embodiment 4.

FIG. 15 is a block diagram showing in detail an example of a functional configuration of acoustic echo suppression device 5D according to Exemplary Embodiment 4.

Acoustic echo suppression device 5D includes first echo suppression unit 20 and second echo suppression unit 30, as in Exemplary Embodiment 1.

When obtaining the detection result that there is no system variation, acoustic echo suppression device 5D outputs the output signal from first echo suppression unit 20 in which the filter characteristic of adaptive filter 23 is updated at update rate $\alpha$, to speaker sp2.

On the other hand, when obtaining the detection result that there is system variation, acoustic echo suppression device 5D outputs the output signal from second echo suppression unit 30 in which the filter characteristic of adaptive filter 33 is updated at update rate $\beta$, to speaker sp2.

In acoustic echo suppression device 5D of Exemplary Embodiment 4, unlike Exemplary Embodiment 1, in addition to first echo suppression unit 20, three microphones mc1, mc2, and mc3 disposed in vehicle compartment 8z in are connected to system variation detector 41D.

Each of microphones mc1, mc2 and mc3 may be a directional microphone or a non-directional microphone.

System variation detector 41D detects the presence or absence of the system variation based on the magnitude of the sound pressure of the voice picked-up by three microphones mc1, mc2, and mc3.

Three microphones ma mc2, mc3 may be disposed on a straight line, or may be disposed to form a triangle.

By using the sound picked-up by three microphones mc1, mc2, and mc3, it is possible to capture the generation source of the sound (sound source) in a three-dimensional manner.

That is, for example, system variation detector 41D estimates that the vehicle window is opened and closed when the vicinity of the vehicle window is a sound source, and estimates that the door is opened and closed when the vicinity of the door is a sound source, and detects the presence of a system variation as assuming that respective environments are varied.

When the number of microphones is three or more, it is possible to specify a position of the sound source in vehicle compartment 8z.

In addition, while microphones used for conversation between driver hm1 and passenger hm2 are used as microphones mc1 and mc2, microphone dedicated to system variation detection may be prepared separately from the microphones used for the conversation.

Further, system variation detector 41D may register in advance the pattern of the sound pressure of the sound generated with the opening or closing of the vehicle window, tilting of a seat, and the like picked-up by three microphones ma mc2 and mc3, and compare the sound pressure of the sound picked-up by three microphones mc1, mc2, and mc3 with the pattern of the sound pressure registered in advance.

As a result of the comparison, when the sound pressure of the sound picked-up by three microphones mc1, mc2 and mc3 coincides with the pattern of the sound pressure registered in advance, system variation detector 41D detects the presence of system variation.

On the other hand, when the sound pressure of the sound generated outside vehicle 8, such as the vibration sound generated by the traveling of the vehicle or the noise generated during waiting for the signal, does not coincide with the pattern of the sound pressure registered in advance, system variation detector 41D may determine that there is no system variation.

As described above, in acoustic echo suppression device 5D according to Exemplary Embodiment 4, system variation detector 41D detects the presence or absence of a system variation based on the voice signal from three microphones mc1, mc2 and mc3 (sound detector) that detect the voice in vehicle compartment 8z.

As a result, a position of the sound source in vehicle compartment 8z may be specified using three microphones, and the presence or absence of the system variation may be detected in consideration of the position of the sound source.

In addition, by using voice, it is possible to detect system variation that occurs gradually over a predetermined time.

It should be noted that, also in Exemplary Embodiment 4, as in Exemplary Embodiment 2, the first, second and third echo suppression units may be used to output the signal after acoustic echo suppression.

Exemplary Embodiment 5

Exemplary Embodiments 5 shows a case of detecting the system variation by using a sensor mounted on a vehicle.

In addition, acoustic echo suppression device 5E of Exemplary Embodiment 5 has substantially the same configuration as acoustic echo suppression device 5 of Exemplary Embodiment 1.

The same components as those of Exemplary Embodiment 1 are denoted by the same reference numerals, and the description thereof will not be repeated.

Figure 16:
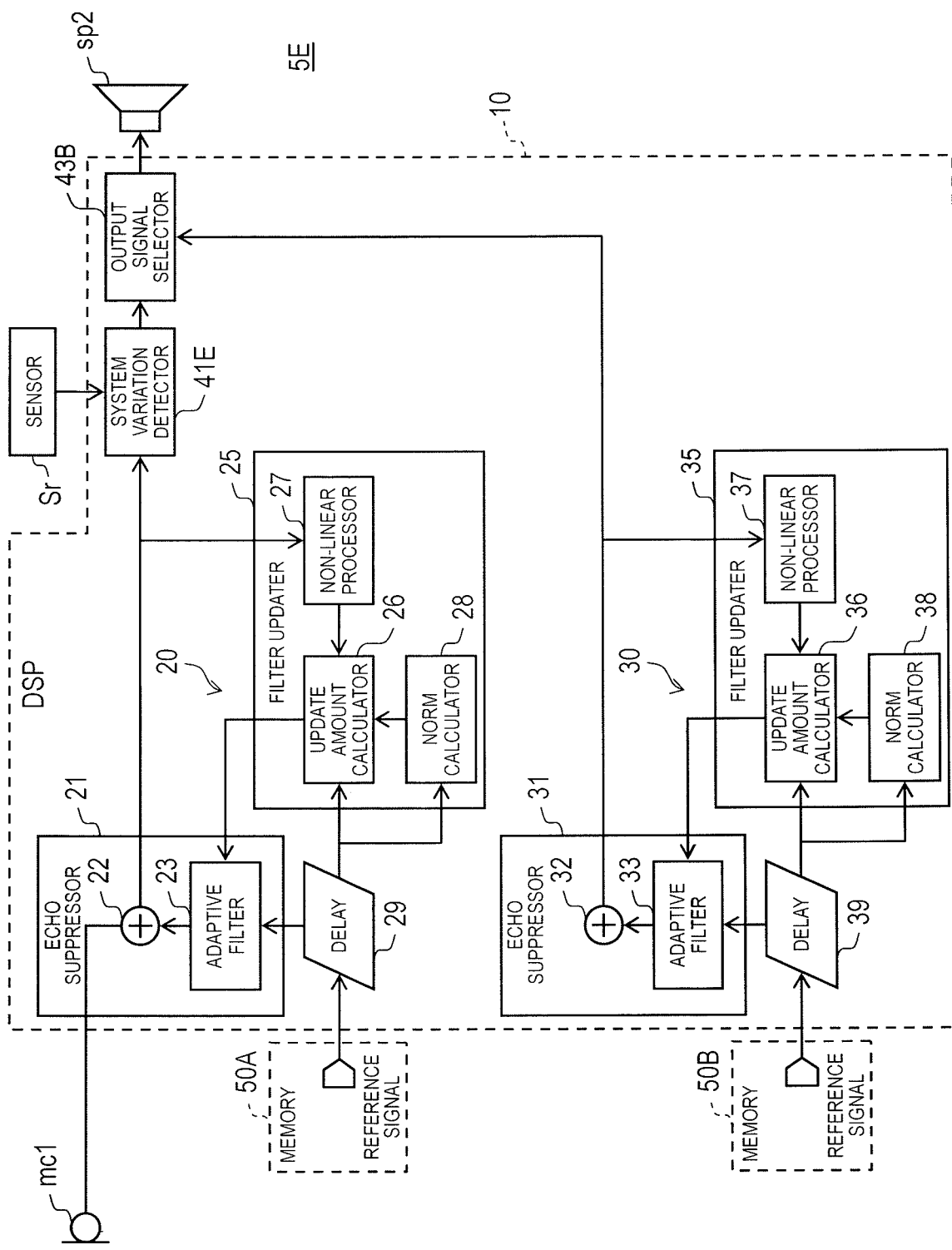
FIG. 16 is a block diagram showing in detail an example of a functional configuration of an acoustic echo suppression device according to Exemplary Embodiment 5.

FIG. 16 is a block diagram showing in detail an example of a functional configuration of acoustic echo suppression device 5E according to Exemplary Embodiment 5.

Acoustic echo suppression device 5E includes first echo suppression unit 20 and second echo suppression unit 30, as in Exemplary Embodiment 1.

When obtaining the detection result that there is no system variation, acoustic echo suppression device 5E outputs the output signal from first echo suppression unit 20 in which the filter characteristic of adaptive filter 23 is updated at update rate $\alpha$, to speaker sp2.

On the other hand, when obtaining the detection result that there is system variation, acoustic echo suppression device 5E outputs the output signal from second echo suppression unit 30 in which the filter characteristic of adaptive filter 33 is updated at update rate $\beta$, to speaker sp2.

In acoustic echo suppression device 5E according to Exemplary Embodiment 5, unlike Exemplary Embodiment 1, in addition to first echo suppression unit 20, at least one sensor Sr disposed in vehicle compartment 8z are connected to system variation detector 41E.

It may be provided with one or more sensors Sr.

When the sensor Sr is a combination of a plurality of sensors, system variation detector 41E may detect the presence or absence of system variation based on the detection signal of each sensor.

Examples of the sensor Sr include a temperature sensor that detects the temperature in vehicle compartment 8z.

Since the rate of sound depends on temperature, when the temperature changes, the characteristics of the sound field largely change.

Therefore, it is effective to detect the temperature in vehicle compartment 8z to determine the system variation.

Further, examples of the sensor Sr include a seat belt SW that is turned on when the seat belt is attached.

When the seat belt SW changes to on or off, it is assumed that the passenger is seated or standing up.

Further, examples of the sensor Sr include an opening or closing sensor that detects the opening or closing of a vehicle window.

When the vehicle window is open, the reproduced sound output from the speaker sp2 is not reflected, so it does not reach microphone mc1 and does not turn into an echo sound.

On the other hand, when the vehicle window is closed, the reproduced sound output from speaker sp2 is reflected by the vehicle window and reaches microphone mc1, which may be the echo sound.

The sensor is merely an example of sensor Sr, and may be any other sensor such as a seat position sensor that detects the longitudinal position of the seat, and a seating sensor that is turned on when the passenger is seated.

System variation detector 41E detects the presence of system variation, assuming that the environment is varied when the sensor Sr is turned on.

As described above, in acoustic echo suppression device 5E according to Exemplary Embodiment 5, system variation detector 41E detects the presence or absence of the system variation based on the signal of the sensor that detects the state in vehicle compartment 8z.

As a result, it is possible to accurately detect the presence or absence of a system variation by using a sensor suitable for detecting the system variation.

For example, when the temperature in the vehicle compartment changes, it is possible to detect the presence or absence of a system variation due to a temperature change which largely influences the characteristics of the sound field by using the temperature sensor.

It should be noted that, also in Exemplary Embodiment 5, as in Exemplary Embodiment 2, the first, second and third echo suppression units may be used to output the signal after acoustic echo suppression.

Although the various embodiments have been described above with reference to the drawings, it goes without saying that the present disclosure is not limited to such examples.

It will be apparent that those skilled in the art that, within the scope described in the claims, can come up with various kinds of modification examples, or modifications, and that they are naturally within the technical scope of the present disclosure.

In addition, the components in the embodiment described above may be optionally combined without departing from the spirit of the invention.

For example, in the embodiment described above, the acoustic echo suppression device is applied to a howling canceller that estimates and suppresses the reproduced sound (echo sound) from the speaker, included in the voice picked-up by the microphone, but it may also be applied to an echo canceller that estimates and suppresses echo sound generated due to crosstalk and the like included in the voice picked-up by the microphone.

Moreover, although the above embodiment shows the case of assisting conversation between two people, the present disclosure may also assist conversation conducted between three or more people.

In this case, both of the microphone and speaker are disposed in the vicinity of a seat where each of three or more passengers is seated, and the acoustic echo suppression devices are installed by the number corresponding to the number of combinations between two people, so that each acoustic echo suppression device performs the acoustic echo suppression function between the corresponding two people.

It should be noted that, the embodiment described above illustrates the case where two or three adaptive filters are used, but the acoustic echo suppression device may be configured using four or more adaptive filters, and may cope with various system variations.

INDUSTRIAL APPLICABILITY

The present disclosure is useful as an acoustic echo suppression device and an acoustic echo suppression method for suppressing the sound quality deterioration of the output voice by following the system variation even when there is a sudden system variation.

REFERENCE MARKS IN THE DRAWINGS 5,5A, 5B, 5C, 5D, 5E ACOUSTIC ECHO SUPPRESSION DEVICE
8z VEHICLE COMPARTMENT
20 FIRST ECHO SUPPRESSION UNIT
23, 33, 83 ADAPTIVE FILTER
25 FIRST FILTER UPDATER
30 SECOND ECHO SUPPRESSION UNIT
35 SECOND FILTER UPDATER
41, 41A, 41B, 41C, 41D, 41E SYSTEM VARIATION DETECTOR
43, 43A, 43B, 43C OUTPUT SIGNAL SELECTOR
50A, 50B, 50C BUFFER MEMORY
80 THIRD ECHO SUPPRESSION UNIT
85 THIRD FILTER UPDATER
CA1 CAMERA
mc1, mc2, mc3 MICROPHONE
Sr SENSOR
sp1, sp2 SPEAKER

The invention claimed is:

1. An acoustic echo suppression device that suppresses acoustic echo in a room where a sound pick-up unit is installed, the device comprising:
a first filter processor which is connected to the sound pick-up unit and outputs a first sound signal obtained by updating an echo component included in a picked-up sound signal acquired by the sound pick-up unit at a first rate;
a second filter processor which is connected to the sound pick-up unit and outputs a second sound signal obtained by updating the echo component included in the picked-up sound signal at a second rate faster than that of the first filter processor, against a sudden variation in a sound field environment in the room;
a detector which detects presence or absence of the variation in the sound field environment in the room; and
an output selector which selects one of the first sound signal and the second sound signal according to a detection result of the presence or absence of the variation in the sound field environment in the room and causes a voice output unit to output the selected sound signal.

2. The acoustic echo suppression device of claim 1, wherein an update rate of a coefficient of a filter unit included in the second filter processor is faster than an update rate of a coefficient of a filter unit included in the first filter processor.

3. The acoustic echo suppression device of claim 1, wherein the detector detects the presence or absence of the variation in the sound field environment in the room based on the first sound signal and the second sound signal.

4. The acoustic echo suppression device of claim 1, wherein, when the first sound signal is smaller than the second sound signal, the detector determines that there is no variation in the sound field environment in the room, and, when the second sound signal is smaller than the first sound signal, the detector determines that there is the variation in the sound field environment in the room.

5. The acoustic echo suppression device of claim 1, further comprising:
a first reference signal memory which stores the first sound signal output from the first filter processor, as a first reference signal; and
a second reference signal memory which stores the second sound signal output from the second filter processor, as a second reference signal,
wherein the first filter processor generates and outputs the first sound signal based on the picked-up sound signal and the first reference signal stored by the first reference signal memory, and
the second filter processor generates and outputs the second sound signal based on the picked-up sound signal and the second reference signal stored by the second reference signal memory.

6. The acoustic echo suppression device of claim 1, wherein, when it is detected that there is no variation in the sound field environment in the room, the output selector selects and outputs the first sound signal, and when it is detected that there is the variation in the sound field environment in the room, the output selector selects and outputs the second sound signal.

7. The acoustic echo suppression device of claim 1, further comprising:
a third filter processor which outputs a third sound signal obtained by updating the echo component included in the picked-up sound signal, at a third rate faster than that of the first filter processor and the second filter processor, against the sudden variation in the sound field environment in the room,
wherein the output selector selects any one of the first sound signal, the second sound signal, and the third sound signal, and causes the voice output unit to output the selected sound signal.

8. The acoustic echo suppression device of claim 7, wherein an update rate of a coefficient of the filter unit included in the third filter processor is faster than an update rate of a coefficient of the filter unit included in the first filter processor and an update rate of a coefficient of the filter unit included in the second filter processor.

9. The acoustic echo suppression device of claim 7, wherein the detector detects the presence or absence of the variation in the sound field environment in the room based on the first sound signal, the second sound signal, and the third sound signal.

10. The acoustic echo suppression device of claim 7, wherein, when the first sound signal is smaller than the second sound signal, the detector determines that there is no variation in the sound field environment in the room, when the second sound signal is smaller than the first sound signal, the detector determines that there is the variation in the sound field environment in the room, and when the third sound signal is smaller than the second sound signal, the detector further determines that there is a large variation in the sound field environment in the room.

11. The acoustic echo suppression device of claim 7, further comprising:
a first reference signal memory which stores the first sound signal output from the first filter processor as a first reference signal;
a second reference signal memory which stores the second sound signal output from the second filter processor as a second reference signal; and
a third reference signal memory which stores the third sound signal output from the third filter processor as a third reference signal,
wherein the first filter processor generates and outputs the first sound signal based on the picked-up sound signal and the first reference signal stored by the first reference signal memory,
the second filter processor generates and outputs the second sound signal based on the picked-up sound signal and the second reference signal stored by the second reference signal memory, and
the third filter processor generates and outputs the third sound signal based on the picked-up sound signal and the third reference signal stored by the third reference signal memory.

12. The acoustic echo suppression device of claim 7, wherein, when it is detected that there is no variation in the sound field environment in the room, the output selector selects and outputs the first sound signal, when it is detected that there is the variation in the sound field environment in the room, the output selector selects and outputs the second sound signal, and when it is detected that there is a large variation in the sound field environment in the room, the output selector further selects and outputs the third sound signal.

13. The acoustic echo suppression device of claim 1, wherein the detector detects the presence or absence of the variation in the sound field environment in the room based on an image captured by a camera that images the room.

14. The acoustic echo suppression device of claim 1, wherein the detector detects the presence or absence of the variation in the sound field environment in the room based on an output signal of a sensor that detects a state in the room.

15. The acoustic echo suppression device of claim 1, wherein the detector detects the presence or absence of the variation in the sound field environment in the room based on sound signals from three or more sound detectors that detect sounds in the room.

16. An acoustic echo suppression method of suppressing acoustic echo in a room where a sound pick-up unit is installed, the method comprising:
outputting a first sound signal obtained by updating an echo component included in a picked-up sound signal acquired by the sound pick-up unit at a first rate;
outputting a second sound signal obtained by updating the echo component included in the picked-up sound signal, at a second rate faster than that of the first rate, against a sudden variation in a sound field environment in the room;
detecting presence or absence of a variation in the sound field environment in the room; and
selecting one of the first sound signal and the second sound signal according to a detection result of the presence or absence of the variation in the sound field environment in the room and causing a voice output unit to output the selected sound signal.

17. The acoustic echo suppression method of claim 16, further comprising:
outputting a third sound signal obtained by updating the echo component included in the picked-up sound signal, at a third rate faster than that of the first rate and the second rate, against the sudden variation in the sound field environment in the room,
selecting one of the first sound signal, the second sound signal, and the third sound signal, and causing the voice output unit to output the selected sound signal, by the output selector.

18. The acoustic echo suppression method of claim 16, further comprising:
detecting the presence or absence of the variation in the sound field environment in the room based on an image captured by a camera that images the room.

19. The acoustic echo suppression method of claim 16, detecting the presence or absence of the variation in the sound field environment in the room based on an output signal of a sensor that detects a state in the room.

20. The acoustic echo suppression method of claim 16, detecting the presence or absence of the variation in the sound field environment in the room based on sound signals from three or more sound detectors that detect sounds in the room.

* * * * *